(12) United States Patent
Chu et al.

(10) Patent No.: US 10,878,448 B1
(45) Date of Patent: Dec. 29, 2020

(54) USING A PID CONTROLLER ENGINE FOR CONTROLLING THE PACE OF AN ONLINE CAMPAIGN IN REALTIME

(71) Applicant: Adobe Inc., San Jose, CA (US)

(72) Inventors: Harrison Chu, Oakland, CA (US); John M. Trenkle, Albany, CA (US); Sarma Tangirala, Berkeley, CA (US); Andrew Wang, San Francisco, CA (US)

(73) Assignee: ADOBE INC., San Jose, CA (US)

( * ) Notice: Subject to any disclaimer, the term of this patent is extended or adjusted under 35 U.S.C. 154(b) by 806 days.

(21) Appl. No.: 15/052,718

(22) Filed: Feb. 24, 2016

Related U.S. Application Data

(63) Continuation-in-part of application No. 14/295,811, filed on Jun. 4, 2014, which is a continuation-in-part of application No. 14/167,183, filed on Jan. 29, 2014.

(Continued)

(51) Int. Cl.
*G06Q 30/00* (2012.01)
*G06Q 30/02* (2012.01)

(52) U.S. Cl.
CPC ..... *G06Q 30/0249* (2013.01); *G06Q 30/0272* (2013.01); *G06Q 30/0275* (2013.01)

(58) Field of Classification Search
CPC ........... G06Q 30/0249; G06Q 30/0272; G06Q 30/0275

(Continued)

(56) References Cited

U.S. PATENT DOCUMENTS

| 5,937,392 A | 8/1999 | Alberts |
| 6,338,043 B1 | 1/2002 | Miller |

(Continued)

FOREIGN PATENT DOCUMENTS

| WO | WO-2011/056346 | 5/2011 |
| WO | WO-2015/034838 | 3/2015 |

OTHER PUBLICATIONS

Computing The Mind, Oxford University Press, Edelman, 2008, pp. xi-36.*

(Continued)

*Primary Examiner* — Gautam Ubale
*Assistant Examiner* — Michael I Ezewoko
(74) *Attorney, Agent, or Firm* — Keller Jolley Preece

(57) ABSTRACT

The invention uses a PID controller engine to provide a desired distribution of targeted ad placements, including controlling campaign pace in realtime to precisely spend a campaign budget over a prescribed runtime, while producing optimum results in a cost efficient manner based on desired targeting parameters. Those parameters include one or more probabilities that a viewer associated with an ad impression opportunity: belongs to one or more targeted demographic categories; will convert with respect to a product or service being offered; has an intention to buy the product or service; or exhibits one or more defined behaviors. Probabilities are determined by a truth-based machine-learning modelling engine. Upon receiving an ad slot opportunity package, a DSP makes a bid decision and determines a bid price, and then sends a bid response to the supply-side partner, all within 200 mS of receiving the ad slot opportunity or the bid will be ignored.

20 Claims, 22 Drawing Sheets

Related U.S. Application Data

(60) Provisional application No. 62/236,515, filed on Oct. 2, 2015, provisional application No. 61/921,032, filed on Dec. 26, 2013, provisional application No. 61/779,231, filed on Mar. 13, 2013.

(58) Field of Classification Search
USPC ........................................................ 705/14.71
See application file for complete search history.

(56) References Cited

U.S. PATENT DOCUMENTS

| | | | |
|---|---|---|---|
| 6,560,578 B2 | 5/2003 | Eldering | |
| 7,181,412 B1 | 2/2007 | Fulgoni et al. | |
| 7,260,837 B2 | 8/2007 | Abraham et al. | |
| 7,493,655 B2 | 2/2009 | Brown | |
| 7,835,937 B1 | 11/2010 | Karlsson et al. | |
| 7,835,938 B1 | 11/2010 | Karlsson | |
| 7,930,285 B2 | 4/2011 | Abraham et al. | |
| 8,069,076 B2 | 11/2011 | Oddo | |
| 8,073,807 B1 | 12/2011 | Srinivasaiah | |
| 8,145,645 B2 | 3/2012 | Delli Santi et al. | |
| 8,175,914 B1 | 5/2012 | Benson et al. | |
| 8,182,346 B2 | 5/2012 | Herrmann et al. | |
| 8,190,475 B1 | 5/2012 | Merrill | |
| 8,341,047 B1 | 12/2012 | Furney et al. | |
| 8,380,562 B2 | 2/2013 | Toebes et al. | |
| 8,412,648 B2 | 4/2013 | Karypis et al. | |
| 8,554,602 B1 | 10/2013 | Zohar et al. | |
| 8,571,930 B1 | 10/2013 | Galperin | |
| 8,650,084 B2 | 2/2014 | Athey et al. | |
| 8,700,543 B2 | 4/2014 | Glickman | |
| 8,719,082 B1 | 5/2014 | Snyder et al. | |
| 8,751,461 B2 | 6/2014 | Abraham et al. | |
| 8,924,993 B1 | 12/2014 | Niebles Duque et al. | |
| 9,087,332 B2 | 7/2015 | Bagherjeiran et al. | |
| 9,135,655 B2* | 9/2015 | Buchalter | G06Q 30/02 |
| 9,715,699 B1 | 7/2017 | Els et al. | |
| 9,727,878 B2 | 8/2017 | Curd et al. | |
| 10,176,484 B2 | 1/2019 | Dilling et al. | |
| 2003/0074252 A1 | 4/2003 | Chandler-Pepelnjak et al. | |
| 2003/0105677 A1 | 6/2003 | Skinner | |
| 2004/0019518 A1 | 1/2004 | Abraham et al. | |
| 2005/0021395 A1* | 1/2005 | Luu | G06Q 30/02 |
| | | | 705/14.41 |
| 2006/0015294 A1 | 1/2006 | Yetter, Jr. et al. | |
| 2006/0018516 A1 | 1/2006 | Masoud et al. | |
| 2006/0074749 A1 | 4/2006 | Kline et al. | |
| 2006/0212350 A1 | 9/2006 | Ellis et al. | |
| 2006/0224496 A1* | 10/2006 | Sandholm | G06Q 40/04 |
| | | | 705/37 |
| 2007/0027760 A1 | 2/2007 | Collins | |
| 2007/0067215 A1* | 3/2007 | Agarwal | G06Q 30/02 |
| | | | 705/14.69 |
| 2007/0094042 A1 | 4/2007 | Ramer et al. | |
| 2007/0180469 A1 | 8/2007 | Finley et al. | |
| 2007/0208728 A1 | 9/2007 | Zhang et al. | |
| 2009/0006145 A1 | 1/2009 | Duggal | |
| 2009/0024546 A1 | 1/2009 | Ficcaglia et al. | |
| 2009/0119172 A1 | 5/2009 | Soloff | |
| 2009/0150238 A1 | 6/2009 | Marsh et al. | |
| 2009/0216619 A1 | 8/2009 | Tavernier | |
| 2009/0254420 A1 | 10/2009 | Curd et al. | |
| 2010/0138290 A1 | 6/2010 | Zschocke et al. | |
| 2010/0262455 A1* | 10/2010 | Karlsson | G06Q 30/0275 |
| | | | 705/14.45 |
| 2010/0262464 A1 | 10/2010 | Monteforte et al. | |
| 2010/0262497 A1* | 10/2010 | Karlsson | G06Q 30/02 |
| | | | 705/14.71 |
| 2011/0035276 A1 | 2/2011 | Ghosh et al. | |
| 2011/0106633 A1 | 5/2011 | Cook | |
| 2011/0137721 A1 | 6/2011 | Bansal | |
| 2011/0145070 A1 | 6/2011 | Wolinsky et al. | |
| 2011/0213654 A1 | 9/2011 | Yang | |
| 2011/0231242 A1* | 9/2011 | Dilling | G06Q 30/0243 |
| | | | 705/14.42 |
| 2011/0246310 A1 | 10/2011 | Buchalter et al. | |
| 2012/0004983 A1 | 1/2012 | Borthwick et al. | |
| 2012/0041816 A1 | 2/2012 | Buchalter | |
| 2012/0054021 A1 | 3/2012 | Kitts et al. | |
| 2012/0158456 A1 | 6/2012 | Wang et al. | |
| 2012/0158954 A1 | 6/2012 | Heffernan et al. | |
| 2012/0197816 A1 | 8/2012 | Short et al. | |
| 2012/0203623 A1 | 8/2012 | Sethi et al. | |
| 2012/0239809 A1 | 9/2012 | Mazumdar et al. | |
| 2012/0316957 A1 | 12/2012 | Zhou et al. | |
| 2012/0323674 A1* | 12/2012 | Simmons | G06Q 30/0249 |
| | | | 705/14.41 |
| 2013/0103681 A1 | 4/2013 | Renders et al. | |
| 2013/0124308 A1* | 5/2013 | Hegeman | G06Q 10/04 |
| | | | 705/14.48 |
| 2014/0236710 A1 | 8/2014 | Nashed | |
| 2014/0278749 A1 | 9/2014 | Trenkle et al. | |
| 2014/0278912 A1 | 9/2014 | Hughes et al. | |
| 2014/0278937 A1 | 9/2014 | Hughes et al. | |
| 2014/0278938 A1 | 9/2014 | Hughes et al. | |
| 2014/0289017 A1 | 9/2014 | Trenkle et al. | |
| 2014/0330646 A1 | 11/2014 | Mierle et al. | |
| 2014/0337143 A1 | 11/2014 | Petersen et al. | |
| 2015/0066639 A1 | 3/2015 | Knapp et al. | |
| 2015/0066662 A1 | 3/2015 | Knapp et al. | |
| 2015/0095166 A1 | 4/2015 | Sweeney | |
| 2015/0106190 A1 | 4/2015 | Wang et al. | |
| 2015/0186927 A1 | 7/2015 | Chittilappilly et al. | |
| 2016/0063573 A1 | 3/2016 | Thakkar et al. | |

OTHER PUBLICATIONS

Metaphors We Live by, Lakoff, University of Chicago Press, 1980, pp. ix-55.*

Frame Analysis, Goffman, Northeastern University Press, 1974, pp. 1-39, 301-344.*

The Daily You, Yale University Press, Turow, 2011, pp. 1-170 [emphasis pp. 79-85].*

YouTube and Video Marketing, John Wiley and Sons, Jarboe, 2012, pp. xv-18, 96, 338-348, 416.*

U.S. Appl. No. 14/143,984, dated Apr. 23, 2018, Notice of Allowance.

U.S. Appl. No. 14/144,016, dated Apr. 20, 2018, Notice of Allowance.

U.S. Appl. No. 14/565,197, dated Apr. 10, 2018, Office Action.

U.S. Appl. No. 14/143,984, dated Nov. 29, 2017, Office Action.

U.S. Appl. No. 14/144,016, dated Dec. 6, 2017, Office Action.

U.S. Appl. No. 13/927,687, dated Jul. 13, 2017, Office Action.

U.S. Appl. No. 14/167,183, dated Jun. 29, 2017, Office Action.

"Advances in Expert Systems", Published by InTech; Edited by Petrica Vizureanu, (Dec. 5, 2012), pp. 101-103.

Nielsen Holdings N.V., "AOL Leverages Nielsen Online Campaign Ratings Measurement to Offer TV-Like GRP Guarantee for Online Video", www.nielsen.com/us/en/insights/press-room/2012/aol-leverages-nielsen-online-campaign-ratings-measurement-to-off. html, (Apr. 16, 2012), 3 pp. total.

Nielsen Holdings N.V., "Nielsen Campaign Ratings Overview", www.nielsen.com/us/en/practices/marketing-effectiveness/nielsen-campaign-ratings/overview.html, (2013), 4 pp. total.

YuMe, "Calculating Online Video GRP for Television Buyers", downloaded from www.YuMe.com, (at least as early as 2010), pp. 1-5.

Baum, Eric, "What is Thought", *The MIT Press*, (2004), pp. 33-65.

Microsoft Press, "Microsoft Computer Dictionary", *Fifth Edition*, (2002), p. 23.

Searle, John R., "Mind—A Brief Introduction", *Oxford University Press*, (2004), pp. 62-67.

Robotics, Science and Systems III, Wolfram Burgard, Oliver Brock, and Cyrill Stachniss, The MIT Press, 2008, pp. 41-48.

Language and Mind, Chomsky, Oxford University Press, 2005, p. 62.

(56) References Cited

OTHER PUBLICATIONS

Computing the Mind, Shimon Edelman, Oxford University Press, 2008, pp. 26-31.
Noetics, Lawrence Krader, 2010, Peter Lang Publishing, pp. 551-553.
Britannica Concise Encyclopedia, Encyclopedia Britannica, 2006, p. 537.
U.S. Appl. No. 13/927,687, dated Apr. 6, 2015, Office Action.
U.S. Appl. No. 13/927,687, dated Oct. 30, 2015, Office Action.
U.S. Appl. No. 13/927,687, dated Oct. 21, 2016, Office Action.
U.S. Appl. No. 14/143,984, dated Dec. 11, 2015, Office Action.
U.S. Appl. No. 14/143,984, dated Jul. 27, 2016, Office Action.
U.S. Appl. No. 14/144,016, dated Dec. 3, 2015, Office Action.
U.S. Appl. No. 14/144,016, dated Jul. 27, 2016, Office Action.
U.S. Appl. No. 14/167,183, dated Dec. 22, 2016, Office Action.
The Presentation of Self in Everyday Life, Anchor Books, Goffman, 1959, pp. 17-76.
Undoing Gender, Routledge, Butler, 2004, pp. 52-101.
U.S. Appl. No. 14/565,197, dated Dec. 20, 2018, Office Action.
U.S. Appl. No. 14/167,183, dated Nov. 29, 2018, Office Action.
U.S. Appl. No. 14/295,811, dated Nov. 13, 2018, Office Action.
U.S. Appl. No. 14/565,197, dated May 29, 2019, Notice of Allowance.
U.S. Appl. No. 14/167,183, dated Jun. 25, 2019, Office Action.
U.S. Appl. No. 14/295,811, dated May 31, 2019, Office Action.
U.S. Appl. No. 14/295,811, dated Feb. 20, 2020, Office Action.
U.S. Appl. No. 14/295,811, dated Jun. 26, 2020, Office Action.
U.S. Appl. No. 16/572,299, dated Sep. 8, 2020, Office Action.

* cited by examiner

USING A PID CONTROLLER ENGINE FOR CONTROLLING THE PACE OF AN ONLINE CAMPAIGN IN REALTIME

CROSS-REFERENCE TO RELATED APPLICATIONS

This application claims the benefit of U.S. Provisional Patent Application No. 62/236,515 filed Oct. 2, 2015 and is a continuation-in-part of U.S. patent application Ser. No. 14/295,811 filed Jun. 4, 2014, which is a continuation-in-part of U.S. patent application Ser. No. 14/167,183 filed Jan. 29, 2014, which claims the benefit of U.S. Provisional Patent Application No. 61/921,032 filed Dec. 26, 2013 and U.S. Provisional Patent Application No. 61/779,231 filed Mar. 13, 2013.

BACKGROUND OF THE INVENTION

1. Field of the Invention

The present invention relates generally to systems and methods for using a PID controller engine to control the pace of an online campaign based on observed and predicted variables.

2. Prior Art

There is a now a need to control the pace of online advertising campaigns to ensure that budgets are spent in the most timely, efficient, and productive manner. Advertiser/clients for whom online advertisements are placed want their ad campaigns to run for a specified amount of time and stay within budget, while reaching the most desirable targeted viewers. This can be difficult to achieve since opportunities to place ads arise in a somewhat random fashion with respect to desired targeting parameters. It is commonplace for online advertising campaigns to either spend their budget early, or extend a campaign beyond the allotted run time. In order to prevent a campaign from extending beyond the allotted runtime, prior art methods frequently choose poor viewer targets towards the end of the campaign and/or choose more expensive targets. A better solution is needed for operating an online advertising campaign in real time, and the present invention addresses this need.

Review of RTB (Real-Time Bidding):

In the RTB environment for electronic media impression auctions, an electronic advertising agency/consolidator operating a demand-side platform receives billions of daily auction opportunities for electronic media impressions from supply-side partners like for example Google®, Yahoo®, etc. These partners operate auctions for ad impressions and then place electronic ads based on auction results. A supply-side partner's auction is considered an external auction with respect to a demand-side platform where an internal auction may also be operated to determine which advertisements (ads) and bids are submitted to the external auction. Each ad impression (ad slot) opportunity includes information parameters about the ad impression—for example and without limitation, the target media property (website), geolocation of the viewer, ad size, viewer cookie, etc, that are used for targeting purposes. The demand side platform then processes hundreds of ads in their system, supplied by advertiser/clients along with desired filtering/targeting parameters, against information parameters supplied by the supply-side partner, and filters out any ads that do not qualify. For example an ad may not be appropriate to submit if the advertiser does not want the ad to target a particular media property (website), age group, gender, etc. For ads that are not removed due to a mismatch with targeting parameters, the demand-side platform then evaluates the corresponding bids that represent how much each advertiser/client is willing to pay. The winning bid in the internal auction is then sent to the external auction at the supply-side partner to compete for the impression opportunity.

Note that in some scenarios, the electronic advertising agency/consolidator operating a demand-side platform and the advertiser/client may in fact be the same entity—for instance when they comprise a large organization with an internal advertising department capable of acting as a demand-side platform. Also, in such an instance there may be no internal auction—just a submission to an external auction.

Review of GRPs:

According to www.wikipedia.org®, Gross Rating Point (GRP) is a term used in advertising to measure the size of an audience reached by a specific media vehicle or schedule. It is the product of the percentage of the target audience reached by an advertisement, times the frequency they see it in a given campaign (frequency×% reached). For example, a television advertisement that is aired 5 times reaching 50% of the target audience each time it is aired would have a GRP of 250 (5×50%). To achieve a common denominator and compare media, reach×frequency are expressed over time (divided by time) to determine the 'weight' of a media campaign. GRPs are used predominantly as a measure of media with high potential exposures or impressions, like outdoor, broadcast, or online (Internet).

GRP values are commonly used by media buyers to compare the advertising strength of various media vehicles, including in recent years, online advertising on the Internet. All GRP calculations to date are historical, being compiled after a campaign completes. Video ads typically contain a pixel pattern called a "tracking pixel" supported by, for instance, Nielsen®. For example, if a user logs onto Facebook® (a Nielsen media partner) and then visits another website where an ad that Nielsen is tracking is shown, Nielsen will put a pixel in the ad that will prompt Facebook to send Nielsen the age and gender of the people who viewed the ad. Nielsen can then match the IP address of the pixel to see if the person is also on a Nielsen panel. If so, the information from the third-party partner can be combined with the panel demographics. This mechanism enables Nielsen to report on the GRPs delivered on a specific online ad campaign after the campaign has completed.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

FIG. 9a describes a campaign addressing polarized viewers. FIG. 9b describes a campaign addressing polarized MPs.

DETAILED DESCRIPTION OF THE PREFERRED EMBODIMENTS

Figure 1:
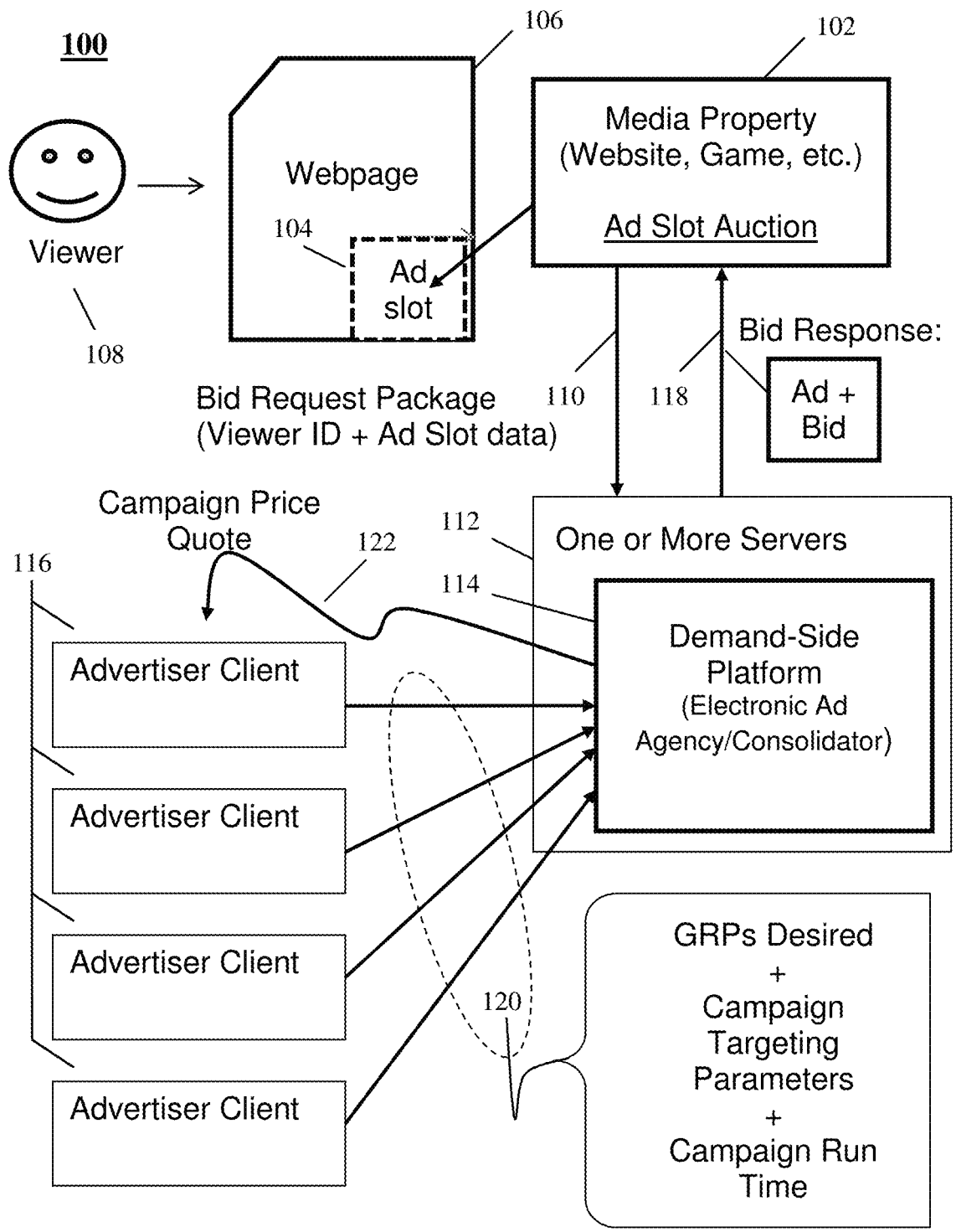
FIG. 1 shows an overview block diagram showing system components and data flow according to the invention.

Systems and methods are disclosed for characterizing websites and viewers, for predicting GRPs (Gross Rating Points) for online advertising media campaigns, and for pricing media campaigns according to GRPs delivered as opposed to impressions delivered. To predict GRPs for a campaign, systems and methods are disclosed for first characterizing polarized websites and then characterizing polarized viewers. To accomplish this, a truth set of viewers with known characteristics is first established and then compared with historic and current media viewing activity to determine a degree of polarity for different Media Properties (MPs)—typically websites offering ads—with respect to gender and age bias. A broader base of polarized viewers is then characterized for age and gender bias, and their propensity to visit a polarized MP is rated. Based on observed and calculated parameters, a GRP total is then predicted and priced to a client/advertiser for an online ad campaign.

Even if a polarization profile for a specific viewer is not known, it is useful to understand the polarization profile or probability for a website where that viewer is about to be offered an ad impression, and a GRP expectation can be computed for such scenarios as described herein. Further, creating a database of polarized websites that have each been profiled according to their polarization probabilities with respect to certain Viewer Characteristics (VCs) is useful not only in estimating GRPs for a campaign. It is also useful as a component of an exemplary process as described herein for profiling unknown viewers in order to classify them and create a database of polarized viewers.

Profiling Polarization of Media Properties

A key function of the processes described herein is to determine the "polarization" of a Media Property. A Media Property or MP represents a specific instance of a media platform for electronically delivering information to a viewer. An MP as referenced herein usually refers to a website or URL on the Internet, however may also refer for example and without limitation to an App ID, a Game ID, or other electronic media including for example electronic billboards. Polarization in general refers to the extent that a particular MP, or as will later be described, a particular viewer, has characteristics that are biased (or not biased) with respect to certain targeting criteria. Polarization ratings are usually expressed in terms of probability percentages—however other rating methods may be used. Targeting characteristics most commonly utilized for polarity rating are typically age and gender, although other characteristics may be also rated without limitation. Viewer age is typically broken down into age brackets, for example 12-17, 18-34, 35-44, etc. Viewers are commonly identified by their electronic "cookie" passed from their computer to a site they are visiting, and as such a process for classification of viewers according to various viewer characteristics is sometimes known as "cookie bucketing". Note that a particular viewer may in fact use multiple computers and therefore have multiple cookies. While multiple cookies may typically be treated as multiple viewers, it is possible to treat them as the same viewer if sufficient information on a viewer and their computer use is known. For the sake of non-limiting examples presented herein, each cookie is assumed to represent a different viewer and the terms "viewer" and "cookie" are assumed to be synonymous.

FIG. 1 shows an overview block diagram describing system components and data flow for a demand side platform according to the invention with a focus on information conveyed relative to polarization profiling of MPs and viewers, and for estimating and quoting GRPs (Gross Rating Points) to an advertiser client 116 provided by a demand-side platform 114. GRP estimation according to the invention includes first establishing databases of known polarized MPs as well as a database of known polarized viewers as described with respect to FIGS. 2 and 3. Per FIG. 1, an ad slot opportunity 104 on a webpage 106 offered by an exemplary media property 102 is offered in an auction for an impression opportunity. Here, an advertisement is to be placed in ad slot 104 on webpage 106 to be viewed by a specific viewer 108. Media property 102 sends a bid request package 110 consisting of viewer identification information for viewer 108 and criteria specific to ad slot 104. This bid request package is received on one or more servers 112 where the demand-side platform 114 operates, and this information is processed thereon. Subsequently, if the impression opportunity fits the targeting criteria of one or more advertiser clients 116, the demand-side platform will respond with a bid response 118 which includes the advertisement itself as well as a bid price.

This particular impression opportunity may fit with a previously defined advertising campaign for one or more advertiser clients 116. For such campaigns, the demand-side platform 114 may have previously provided a price quote 122 for such campaign. As opposed to simply quoting impressions to be purchased, according to the invention such a campaign may be quoted in terms of GRPs delivered, essentially guaranteeing viewing reach for specific targeting criteria. In order to receive such a campaign price quote 122, an advertiser client 116 would have previously delivered to the demand-side platform a request for a quotation including information package 120. Information package 120 includes for example and without limitation: GRPs desired; campaign targeting parameters; and campaign runtime.

Figure 2:
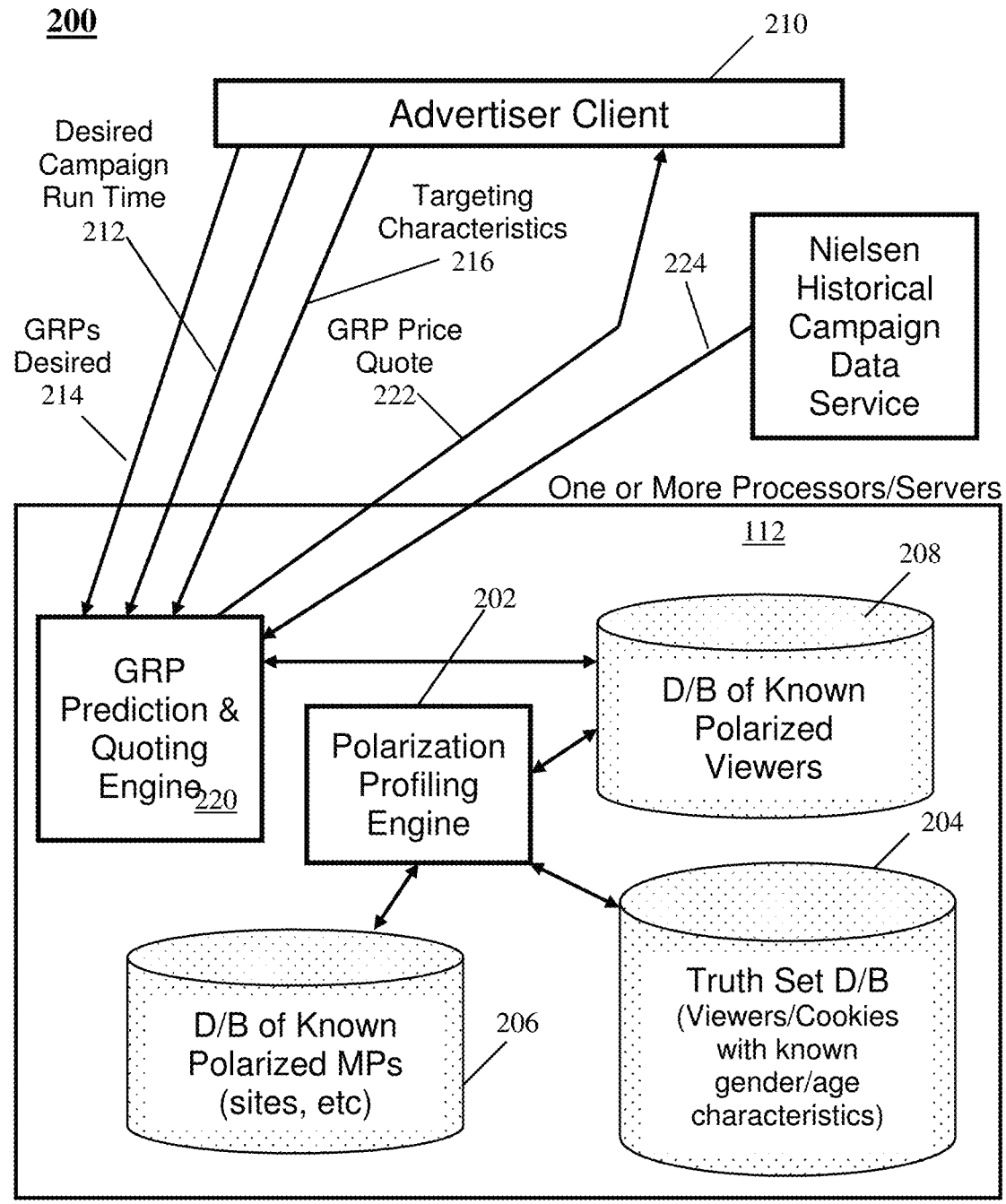
FIG. 2 shows an overview block diagram showing system components and data flow for website and viewer polarization profiling as well as GRP prediction and quoting according to the invention.

FIG. 2 shows an overview block diagram describing system components and data flow for website and viewer polarization profiling as well as GRP prediction and quoting according to the invention. Here, a polarization profiling engine 202 operating on one or more processors/servers 112 operates according to the exemplary flow described in FIG. 3, first creating a database of polarized MPs 206 based on the activity of viewers in truth set 204. Viewers in truth set 204 are characterized at least by gender, however may also be characterized for example and without limitation by age, geographic locations ("geos"), and other characteristics. Subsequently a database of known polarized viewers 208 is created by the polarization profiling engine. Optionally, look-alike viewers may be categorized as described herein and added to the database of known viewers based on comparing with known polarized viewers.

Subsequently, an advertiser client 210 may supply an information package 120 to the demand-side platform including a desired campaign runtime 212, a quantity of GRPs desired 214 for a campaign, and targeting characteristics 216 for the campaign. In response, GRP prediction and quoting engine 220 operating on one or more processors/servers 112 provides a GRP price quote 222 to advertiser client 210. Should the advertiser client find the quote acceptable they will normally proceed to engage with the demand-side platform to execute the campaign. When the campaign is completed, a package of historical campaign data 224 is obtained from Nielsen® in order to validate the reach of the campaign.

Figure 3:
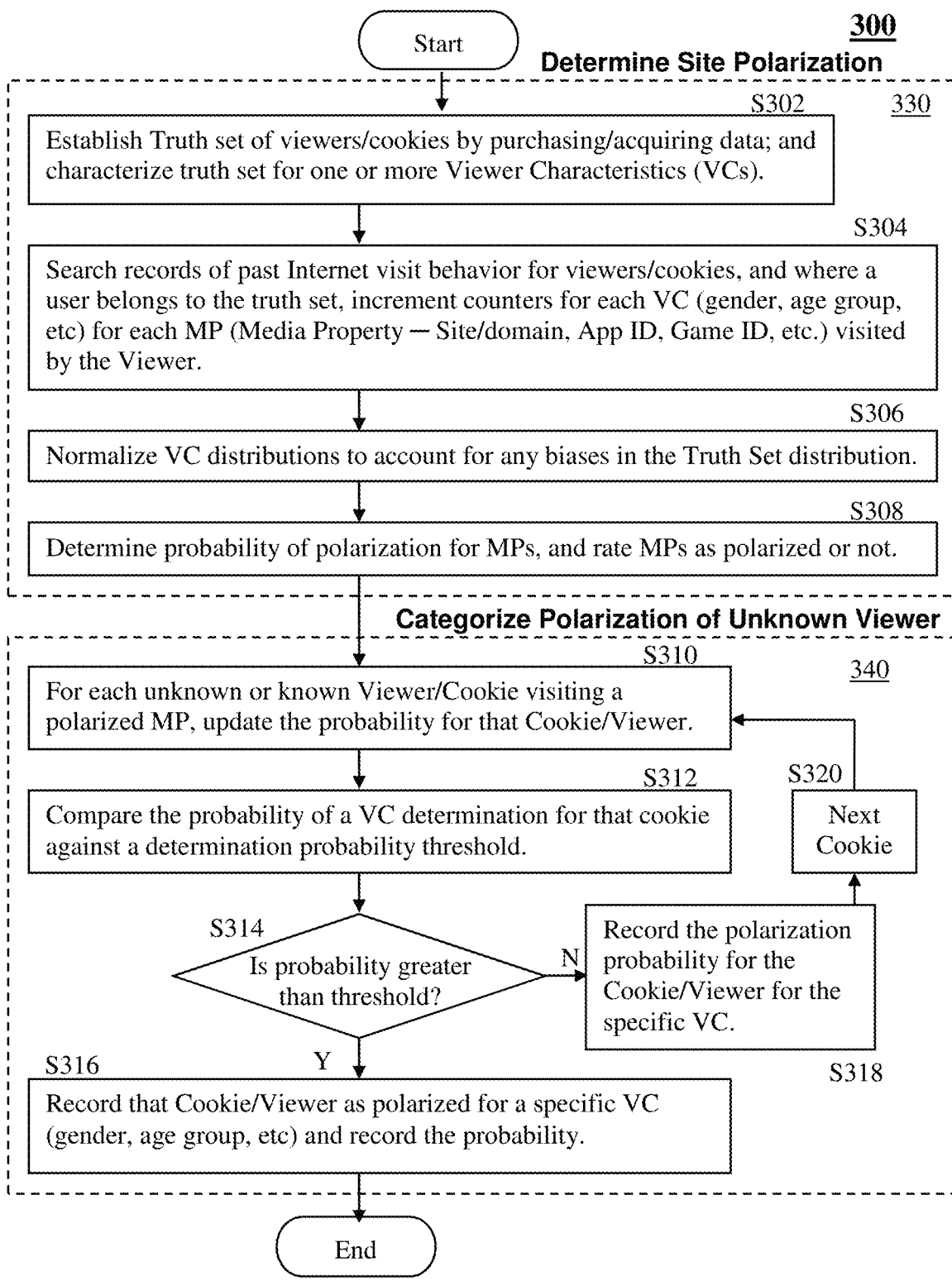
FIG. 3 shows a flowchart with exemplary and non-limiting methods described for the determination of site polarization as well as determination of polarization for unknown viewers in order to classify them as known polarized viewers.

As shown in flowchart 300 of FIG. 3, a first phase of an exemplary and non-limiting polarization characterization process according to the invention involves a determination 330 of polarization characteristics for different MPs (typically websites) that viewers may visit. Within this process, a first step is to establish 302 a "Truth Set" of viewers/cookies by purchasing or otherwise acquiring data. A truth set is a database of specific viewers including their cookies and known characteristics for those viewers such as for example age and gender. Once a truth set is available, it is then characterized for one or more Viewer Characteristics (VCs) per step S302.

Subsequently per step S304, records of past Internet visits are searched and analyzed relative to the behavior of different viewers going back in time by a specified number of months. Where a viewer in the records of past Internet visits belongs to the truth set, counters are incremented for each VC (gender, age group, etc) for each MP (Media Property—Site/domain, App ID, Game ID, etc.) visited by the viewer. Once this process is finished, at least an empirical male/female frequency or probability has been established for every Media Property matched by at least one viewer/cookie from the truth set. In a similar way, each MP is also profiled for polarization with respect to viewers/visitors in different age brackets and any other VC category of interest.

With respect to for instance gender, statistically the gender distribution is expected to be approximately 50:50 in the general Internet populace, and therefore it is appropriate to then normalize 306 distributions for each media property to account for any biases in the Truth Set distribution. In order to accomplish this, the gains to be applied to the Male and Female probabilities are computed as follows:

First, the number of viewers/cookies representing the "Least Frequent Gender" is calculated to be equal to the minimum number of either the (Females in the Truth Set) or the (Males in the Truth Set). Then the gain factor for each gender subset is calculated as follows:

Gain for Females=Least Frequent Gender/Females in Truth Set

Gain for Males=Least Frequent Gender/Males in Truth Set

Then, the Unbiased Probability ("P") for each gender at each media property (MP) is determined S308 as follows:

$P$(Female) for $MP$=Gain for Females*(Female Count for $MP$/Total Cookies at $MP$)

$P$(Male) for $MP$=Gain for Males*(Male Count for $MP$/Total Cookies at $MP$)

At this point, a database of polarized MPs has been created where for each MP, a polarization probability exists for each VC for which a characterization determination was performed with respect to the truth set. One embodiment of GRP prediction and quoting utilizes this polarized MP database to calculate predicted GRP reach for a proposed campaign and to create a price quote for that campaign.

After an initial classification process for polarized websites using the truth set per FIG. 3, MPs may be further "bucketed" or classified each time a viewer in the truth set visits a website, therefore further enhancing the classification accuracy for any MP so visited.

Polarization Profiling of Viewers

In predicting the results of a campaign it can be especially useful if the polarization of a potential viewer is understood when impression opportunities arise on a particular MP for that viewer. As such, it is useful to profile and classify unknown viewers with respect to VCs and build a database of known polarized viewers including a probability of polarization with respect to different VCs for each polarized viewer.

Choosing a set of MPs (media properties) that will allow the profiling of viewers/cookies that are not members of the truth set is done as follows:

Per step 308, all MPs are identified whose unbiased distributions are highly polarized towards Male or Female (or towards any other VCs being analyzed), and these are rated as "polarized". Stereotypical examples of websites (MPs) exhibiting extreme degrees of polarization include for instance: Sports-oriented for Males; and Fashion-oriented for Females.

To accomplish this, a threshold is applied to the dominant gender, that is, if the value of:

$$\text{Max}(P(\text{Female}), P(\text{Male}))$$

is greater than a predefined threshold, for example and without limitation 0.80, then the MP is added to the Polarized Set with respect to the VC being analyzed—for instance in this example, gender. This typically results in 100s to 1000s of media properties being added to a database of polarized MPs, with varying levels of traffic being categorized as "polarized" or not. In all cases, the polarization probability for an MP with respect to each VC is recorded, and this is useful in some embodiments of GRP estimation and quoting when not all sites chosen by an advertiser/client are highly polarized, and some sites with only moderate polarization must be included in order to fulfill the reach and/or time frame requirements of a campaign.

To categorize 340 any unknown viewer/cookie for VC polarization probability, for example gender (Male or Female), an exemplary process according to the invention keeps a running probability for each of them. By default the distribution is set at:

$$P(\text{Female})=0.5 | P(\text{Male})=0.5$$

Each time that a cookie/viewer is seen viewing a polarized MP, the probabilities for that cookie/viewer are updated S310 as follows (with the assumption that each auction is statistically independent):

$$P(\text{Male})' = P(\text{Male}) * \text{Polarized Site } P(\text{Male})$$

$$P(\text{Female})' = P(\text{Female}) * \text{Polarized Site } P(\text{Female})$$

where the:

Denominator for Normalization=$P(\text{Male})'+P(\text{Female})'$

Therefore:

$P(\text{Male})''=P(\text{Male})'/\text{Denominator for Normalization}$ $P(\text{Female})''=P(\text{Female})'/\text{Denominator for Normalization}$ which guarantees that the definition of probability holds, that is:

$P(\text{Male})''+P(\text{Female})''=1$

Each time that a cookie/viewer is seen visiting a polarized site, the probabilities are re-adjusted. Multiple hits on highly polarized sites of the same orientation rapidly result in gender assessments with probability generally exceeding 0.95.

Finally, any time it becomes useful to delineate a male or female segment from the database of classified polarized viewers/cookies, all members are analyzed and their probabilities for a particular VC are compared S312 with a threshold for whichever direction is dominant for the particular VC, for example in the case of gender, Max(P(Female), P(Male)).

The chosen threshold value corresponds directly to the predicted overall accuracy for the segment, while the expected accuracy for gender (Male and Female) for example, is equal to the mean probability across all chosen viewers/cookies. One exemplary and non-limiting threshold would be 0.92, but it can be lowered to increase the size of the pool (reach) traded off against accuracy.

Per step S314, for a cookie/viewer and a particular VC, if the polarization probability is greater S314 than the threshold value, that Cookie/Viewer is recorded S316 as polarized for the specific VC (gender, age group, etc) with the specific probability value also being optionally recorded in the known viewer database. If on the other hand, that cookie/viewer has a polarization probability less than the threshold value, then the probability value for that Cookie/Viewer may be still optionally recorded S318 for the specific VC (gender, age group, etc) in the known viewer database. After either steps 316 or S318, the next cookie/viewer S320 is analyzed per step 310.

Note that it is preferable that multiple cookie/site hits are not recorded, so hitting the same site again and again won't change a viewer's probabilities. Also note that it is significant that only highly polarized MPs are considered as "polarized"—using all probabilities would result in a per-cookie assessment in which the biases would be drowned out by the more frequently seen sites that are not polarized.

Figure 4:
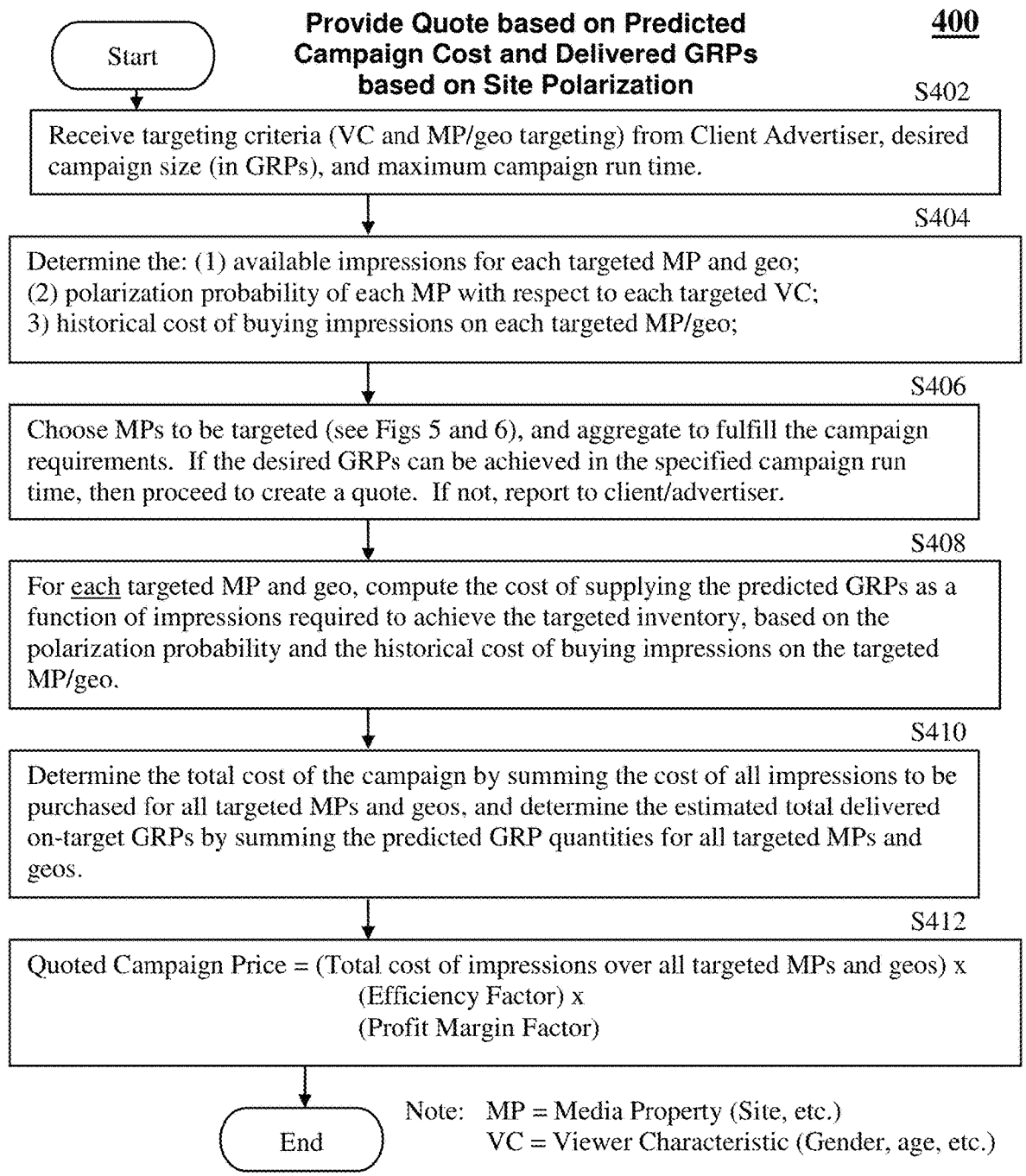
FIG. 4 shows a flowchart for the process whereby prices quoted to an advertiser client for on target GRPs delivered for an electronic advertising campaign based on site polarization profiles.

Once a set of viewers/cookies has been thus classified with high accuracy, they can be used as a further means to profile MPs for polarity in a manner similar to how the truth set is utilized per the process of FIG. 4. In this case however, since unlike the truth set each VC for a particular polarized viewer is typically less than 100% probable, the analysis must take into account the probability for each VC for a particular viewer/cookie being used.

Also, the approach can extend beyond just sites/apps/games to partial URLs, verticals and any other attributes that are available in auction protocols. Furthermore, with the appropriate truth set, classification can be extended to age brackets, marital status, children in household, etc.

Extensions of the methods described herein include, for example, where the number of classified viewers/cookies in the known viewer database is increased by adding "look-alikes". Here, cookies/viewers that did not hit any polarized sites are classified based on similar behavior to classified cookies where the classified cookies have a probability established for different VCs.

Determining Look-Alike Viewers Based on Polarized Viewers

Look-Alike modeling has been used for some time in advertising campaigns and is currently used in electronic and online advertising. In general, look-alike modeling includes selection of a trait or target segment and data sources for analysis, including a baseline population database for comparison. The analysis looks for viewers in the data sources that are identical or similar to viewers in the baseline population with respect to the selected trait or target segment. Then, newly discovered traits are ranked in order of influence or desirability. The ranking may be a number between, for instance, 0 to 1. Ranks closer to 1 means they are more like the audience in the baseline population. Also, heavily weighted traits are valuable because they represent new, unique viewers who may behave similarly to the established audience represented in the baseline population. The result is a database of "Look-Alike Viewers" who have characteristics similar to those in a well-characterized baseline population. For the invention, the baseline population is typically the database of known, polarized viewers. Adding look-alike viewers to the database of known viewers enables larger campaigns to be addressed where the database of known polarized viewers alone is not large enough to meet the campaign requirements in terms of reach and/or run time. Also, since a look-alike viewer has not been profiled by the method described for FIG. 3, the polarization probability for a look-alike viewer may optionally be down-graded relative to that of the known polarized viewers that were used to determine the look-alike viewer. For example if the male gender assessment for known male polarized viewers is 95%, then the gender assessment for a look-alike polarized viewers might for example be 80%.

Predicting, Pricing, and Selling GRPs

While ad campaigns historically are priced by impressions, an impression does not guarantee that a targeted viewer has interacted with the MP. The ability to purchase an ad campaign and know that the reach (on-target viewed ads) is guaranteed would be advantageous for an advertiser. For a demand-side-platform or online ad agency to price according to GRPs or "reach", requires a statistical confidence in the ability to supply a given degree of on-target reach for a given number of impressions purchased, in order to offer such a service at a profit. An on-target view is one where the viewer's characteristics match the targeted characteristics of a campaign. For instance, if an ad campaign is for men's sporting goods, male viewers are typically targeted. When an impression is presented to a female, such a viewing would NOT be on-target for that campaign.

A large historical database is required to support an offering capable of guaranteeing a level of GRP reach, so that the cost of reaching specific categories of viewer can be predicted with an acceptable level of statistical probability. According to one exemplary and non-limiting embodiment of the invention, viewer activity is bucketed over an extensive period of time where MPs (Sites) are profiled according to characteristics (age bracket, gender, etc.) of visiting viewers, and a degree of "polarization" is established for each MP with respect to each viewer characteristic (VC).

Viewers are classified according to their propensity or polarization to visit polarized websites, with respect to each VC type. Systems and methods for creating such databases are described herein with respect to FIGS. 1-3. The cost of each viewer interaction is also accumulated. Thus, a historical summary may be referenced that indicates how many MPs are historically in a bucket (classification category), and the cost of reaching those viewers. For any VC with respect to either an MP or a known viewer, a polarization probability—typically described as a fraction or percentage—is available as a result of the processes described with respect to FIGS. 1-3.

The definition of GRPs (Gross Rating Points) for online advertising such as that addressed herein, is (Reach×Frequency), defined more specifically as:

(number of unique views/online population segment or specific target audience)×(average exposures per viewer over the course of the campaign)

The process of quoting a GRP campaign to a client/advertiser begins with step S402 of flowchart 400 of FIG. 4, where a demand-side platform or online advertising agency receives targeting criteria from the advertiser client. This targeting criteria includes desired VC targeting as well as any MPs and specific geographic locations (geos) the client desires to target. A maximum runtime for the campaign is also included. The desired campaign size (reach) in GRPs may also be provided by the advertiser client. Subsequently according to exemplary and non-limiting embodiments described herein the demand-side platform provides a quotation (price) for GRPs that are "on target"—in other words the reach for the campaign is guaranteed to include viewers that possess the specific targeting characteristics specified by the client/advertiser.

In step S404, the demand-side platform determines the available impressions for each targeted MP and Geo as well as the polarization probability of each targeted MP with respect to each targeted VC, and the historical cost of buying impressions on each of the targeted MPs. Specific MPs to be targeted for the campaign are chosen 406 according to flowcharts 500 and 600 of FIGS. 5 and 6 respectively. Per FIGS. 5 and 6, MPs are chosen and aggregated either based on client selection and/or automatically based on the historical cost in proportion to the polarization probability for an MP (typically described by $ per % point). At the start, the client may supply a list of MPs and geos from which the demand side platform may choose automatically in order to assemble a possible campaign (per FIG. 5), or alternately, the client may specifically choose each MP and Geo that are to be part of the campaign (per FIG. 6).

Per S406 the total number of impressions that must be purchased to achieve the desired level of on-target GRPs is then determined. Subsequently in S406 it is determined if the desired GRPs can be achieved in the specified campaign run time. If that is the case, the process proceeds to step S408. If desired on-target GRPs cannot be achieved, this result is reported to the client/advertiser.

To create a price quotation, per S408 each targeted MP and Geo are examined to determine the cost of supplying the predicted GRPs as a function of impressions required to achieve the targeted inventory, based on the polarization probability and the historical cost of buying impressions on the targeted MP/geo. In general, "inventory" is the quantity of impressions typically available on a specific MP during a specified campaign run time. This is determined historically and the most relevant data is typically the most recent.

In general, since the polarization probability of any MP is less than 100% for any VC, a larger number of impressions will need to be purchased in order to achieve the desired number of on-target views required to provide the requested GRPs. For example, a campaign may find that 10,000 impressions are available on YouTube during the campaign run time. YouTube has a polarization probability value of 0.45 for Males (45% of the audience is male), so if 10,000 impressions are purchased on YouTube for a male-targeted campaign, the on-target impressions are 4,500 and the potential wastage is 5,500. The cost of providing the 4,500 on-target impressions is the calculated as the cost of purchasing 10,000 impressions. The number of impressions to be purchased for an MP is therefore equal to the desired on-target impressions divided by the polarization probability for that MP with respect to a targeted VC, the polarization probability being expressed as a fraction representing a probability percentage. Also, when a campaign is targeting more than one VC—for instance males plus a specific age bracket such as 18-25—the polarization probabilities for both VC should be taken into account for that VC. One exemplary and non-limiting method to combine the effect of both VCs is to multiply the polarization probabilities to produce a composite polarization probability for the MP with respect to that specific campaign.

Per S410, the total cost of the campaign is then determined by summing the cost of all impressions to be purchased for all targeted MPs and geos, and the estimated total number of delivered on-target GRPs is determined by summing the predicted GRP quantities for all targeted MPs and geos.

Finally per S412, a Campaign Price to be quoted is computed according to the following exemplary and non-limiting formula:

Quoted Campaign Price=(Total cost of impressions over all targeted MPs and geos)×(Efficiency Factor)×(Profit Margin Factor)

Here, the efficiency factor and profit margin factor are variable and may be altered by the demand-side platform from one campaign to another depending upon campaign results and other factors. A method for adjusting the efficiency factor from time to time is described by the process shown in FIG. 7.

Figure 5:
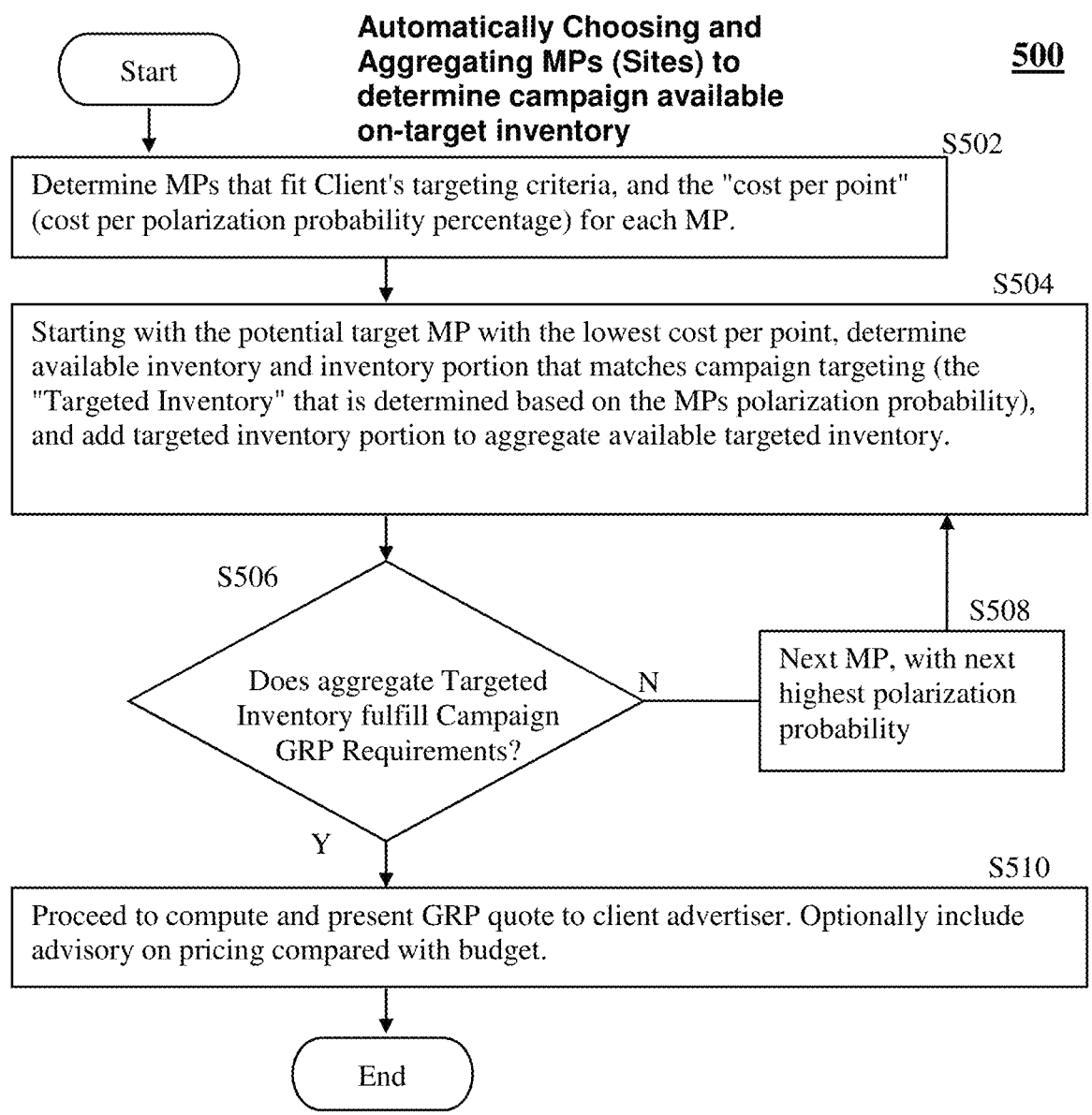
FIG. 5 shows an exemplary process for choosing and aggregating Media Properties (MPs) automatically to determine available campaign inventory.
Figure 6:
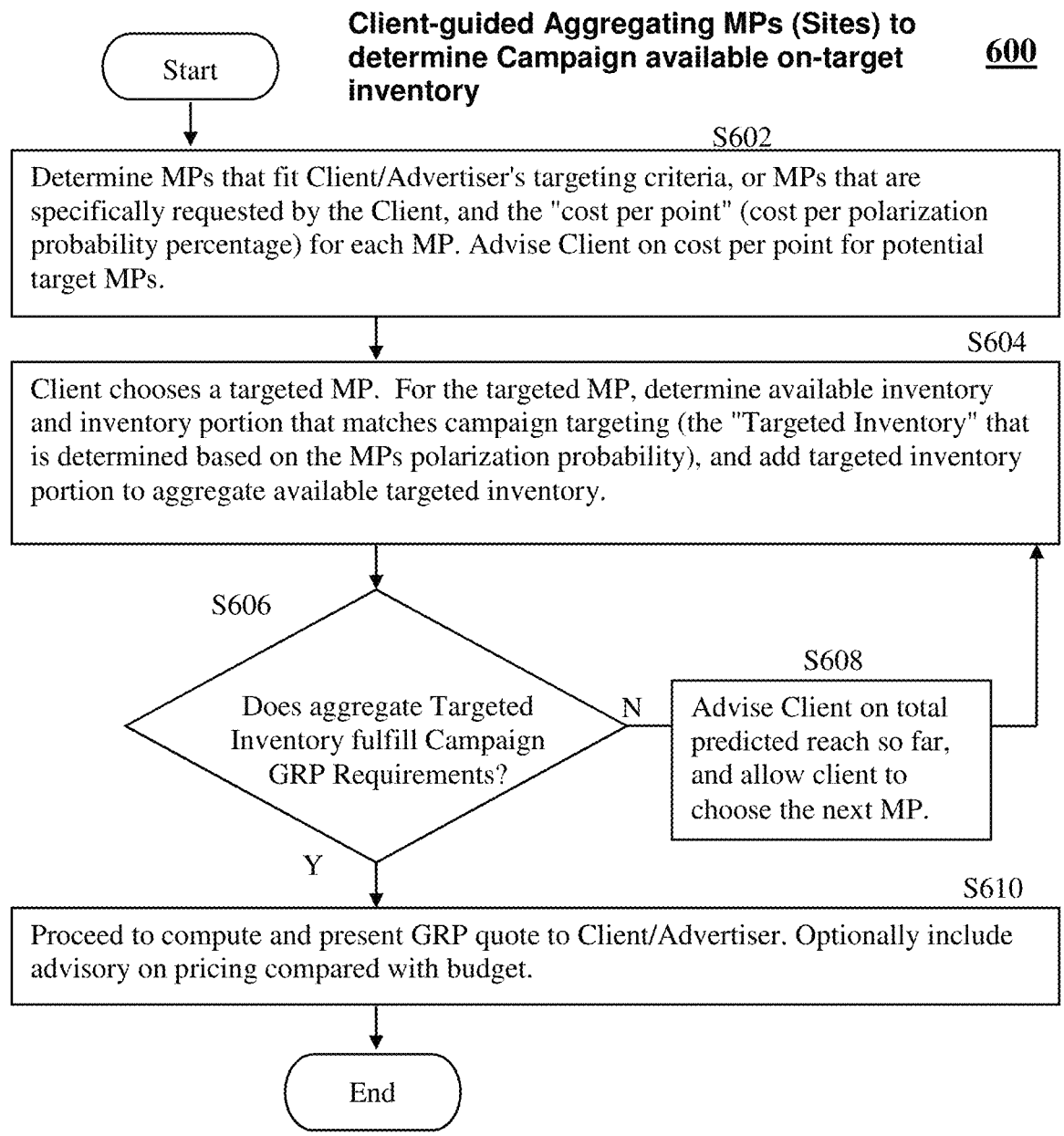
FIG. 6 shows an exemplary process for choosing and aggregating MPs to determine available campaign inventory wherein a client specifically chooses MPs to be included in the campaign.

FIGS. 5 and 6 show flowcharts for processes whereby MPs are chosen and aggregated to determine a total quantity of on-target inventory that is available for a specific campaign.

FIG. 5 shows a process whereby a demand-side platform may automatically choose which MPs are used in a campaign, either from a list of possible MPs supplied by a client/advertiser, or alternately from all possible MPs that have previously been profiled for polarization. According to an alternate embodiment, the process may mix MPs specified by the advertiser/client with other MPs having known polarization profiles in order to assemble a campaign. Typically, a client/advertiser will choose which of these alternatives they would like the demand-side platform to utilize in assembling a campaign.

According to flow chart 500 of FIG. 5, a system according to the invention automatically determines 502 MPs that fit a client's targeting criteria, and also determines the "cost per point" or cost per polarization probability percentage for each MP. Thus when selecting MPs to add to the campaign, the system can qualify the cost-effectiveness of each such addition. If the polarization percentage or probability was the sole factor evaluated in determining which MPs to add to the campaign, a highly polarized site might be added but have such an extreme cost that it consumes the campaign budget well before the desired number of on-target impressions has been reached. As a result it is preferable to prioritize the addition of MPs to a campaign according to the cost-per-point rather than simply on polarization probability.

For any MP, there is a relationship in aggregate between winnable impressions and CPM bid, and this data is accumulated over time and is available to help determine what inventory is available a bid price. This is used to estimate how many impressions are buyable at any CPM bid. This data may be utilized for determining available impressions and cost. Thus, if an MP does not have enough targeted inventory at a given bid price point, the bid price can be raised to produce more inventory, however at a higher cost per point. Thus, the bid price may be adjusted by the client/advertiser or automatically by the system in order to provide more inventory from highly desirable polarized sites.

Per step S504, the process starts by identifying the potential target MP having the lowest cost per point, and determining for that MP the available inventory as well as that portion of the available inventory that matches the campaign targeting criteria. This portion then becomes the "on target" inventory or "targeted inventory" and is determined based on the MPs polarization probability. For example during the runtime allocated for a campaign, assume that an MP called "X" historically would have 10,000 impressions available. If the polarization percentage for MP "X" is 60% for a VC describing male viewership and the campaign in question is targeting male viewers, then during the runtime for the campaign it follows that there will be 6,000 on-target viewers receiving impressions. The campaign will however have to pay for the entire 10,000 impressions in order to provide the 6,000 on target impressions. After this MP having the lowest cost per point has been added to the campaign, the system evaluates S506 whether or not the aggregated on-target inventory fills the campaign GRP requirements. If not, the flow proceeds S508 to locate the next MP having the next lowest cost per point where the polarization is in line with campaign targeting. Subsequently step S504 is executed again for this next MP.

Upon adding an MP to the campaign, should it be determined per step S506 that the campaign GRP requirements would be fulfilled, the flow proceeds to S510 where a quotation for the campaign in terms of price and GRPs is prepared and provided to the client/advertiser. Optionally the client/advertiser will be advised on how the quoted price compares with any established budget.

According to flow chart 600 of FIG. 6, a Client/Advertiser supplies a list of MPs to be targeted and may specifically add MPs to a campaign. The system according to the invention automatically determines 502 the "cost per point" or cost per polarization probability percentage for each MP, and advises the client. Thus when selecting MPs to add to the campaign, the Client can be aware of the cost-effectiveness of each such addition.

Per step S604, a client chooses a targeted MP to add to the campaign. For the targeted MP, the system according to the invention then determines available inventory and the inventory portion that matches campaign targeting (the "Targeted Inventory" that is determined based on the MPs polarization probability). This targeted inventory portion is then aggregated into the available targeted inventory.

After this MP has been added to the campaign, the system evaluates S606 whether or not the aggregated on-target inventory fulfills the campaign GRP requirements. If not, the flow proceeds S608 where the client is advised on total predicted reach so far, and the client proceeds to choose the next MP to add to the campaign. The flow then reverts to step S604 where the client chooses another MP to add to the campaign.

Upon adding an MP to the campaign, should the system according to the invention determine per step S606 that the campaign GRP requirements would be fulfilled, the flow proceeds to S610 where a quotation for the campaign in terms of price and GRPs is prepared and provided to the client/advertiser. Optionally the client/advertiser will be also advised on how the quoted price compares with any established budget.

A simplified example might include a campaign that has two target sites. Site #1 has a polarization factor of 60% male and site #2 has a polarization factor of 70% male. The campaign is targeting males. So, for site #1 the campaign would need to purchase 100 impressions to get 60 on target, and for site #2 the campaign would we need to purchase 100 impressions to get 70 on target. If the campaign goal was to reach 130 on-target impressions, 60 would be from site #1 and 70 from site #2. If the campaign goal was higher, but the available inventory on sites #1 and #2 was only 100 impressions each, the demand side platform would tell the client that only 130 on-target impressions can be delivered unless they add more sites to the campaign. Also for this simplified example, according to FIG. 5 site #2 would be added to the campaign before site #1.

Figure 7:
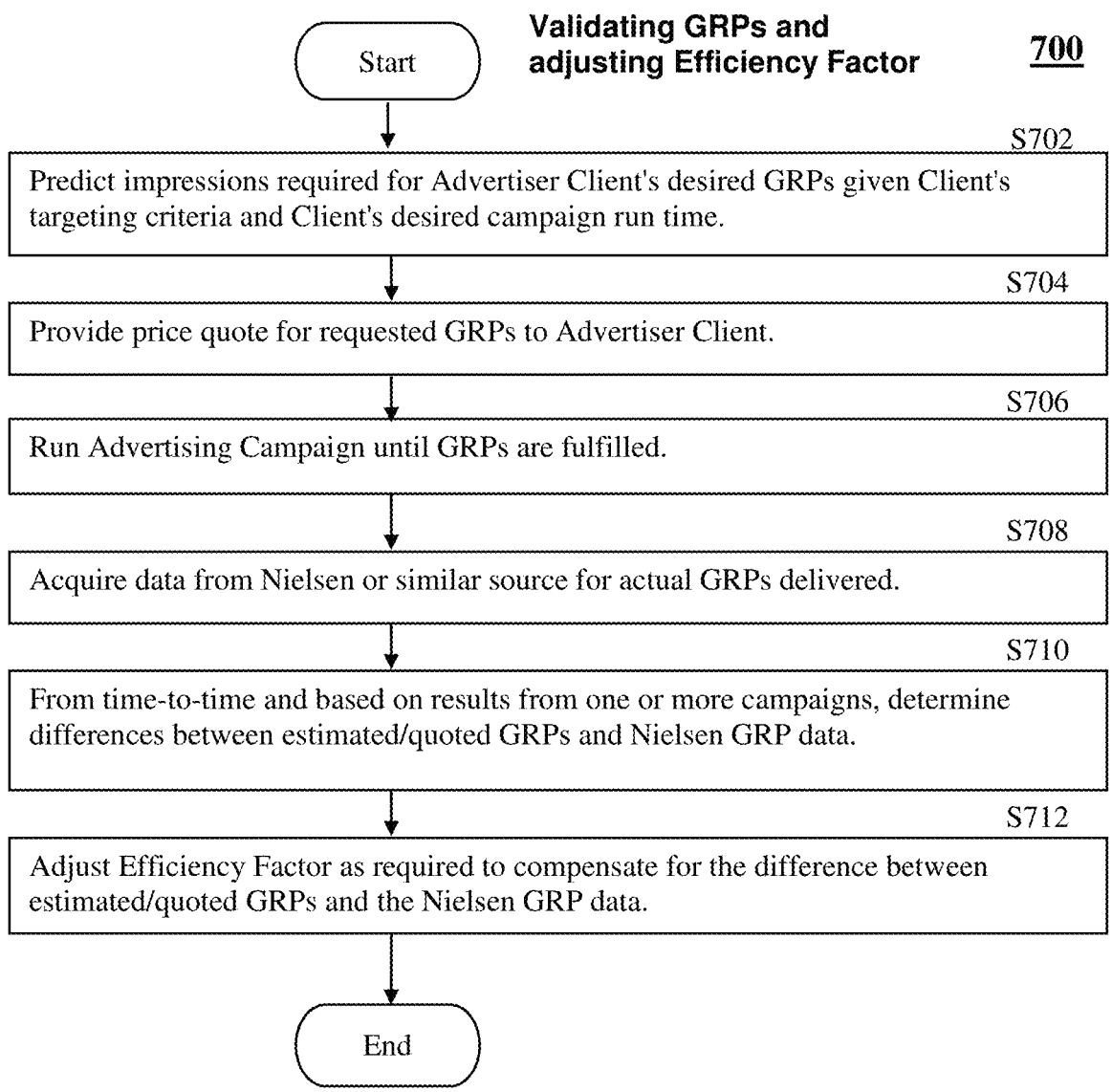
FIG. 7 shows an exemplary process for operating an electronic advertising campaign whereby a quantity of on-target GRPs are provided to a client advertiser at a predetermined quoted price, and from time to time after a campaign has been completed, an Efficiency Factor is adjusted based on GRP data acquired from a third party such as for example, Nielsen.

The overall flow for operation of an electronic advertising campaign according to an exemplary embodiment of the invention is shown in FIG. 7, including validation of GRPs delivered and adjustment of an efficiency factor. As mentioned earlier, information is typically available from third-party organizations such as Nielsen after an advertising campaign has been run that quantify the reach or GRPs achieved by the campaign. Since the method for estimating and providing a GRP quote before a campaign has run involves statistical predictability, the ability to reconcile with actual achieved reach after a campaign is implemented through the "efficiency factor" is an important component of the process. As the efficiency factor is adjusted from time to time comparing predicted results with real results, the ability to predict future campaigns with greater accuracy is improved. By performing this reconciliation from time to time and not after each campaign has run, the efficiency factor is adjusted in a controlled environment rather than on random campaigns. This avoids the possibility that individual campaigns may have unique or even aberrant differences that would throw off the result to some extent.

Per flow chart 700 of FIG. 7, impressions required to be purchased to achieve an advertiser/client's desired GRP amount are estimated S702 given the client's targeting criteria and the client's desired campaign run time. In step S704, a price quote for requested GRPs is provided to the advertiser/client. Per step S706, the advertising campaign is run until the required GRPs are achieved or until the budget is spent. Then, in step 708, data is acquired from Nielsen or a similar source including actual GRPs delivered for the campaign. In step 710, from time-to-time and based on results from one or more campaigns, the difference between GRPs estimated prior to campaigns and the Nielsen data for GRPs actually delivered is calculated. A comparison can also be made between the Nielsen GRP data and GRPs recorded by the demand side platform for each campaign. Finally per step S712, the Efficiency Factor is adjusted as required to compensate for the differences between estimated/quoted GRPs and Nielsen GRP data, or alternately between GRPs delivered as recorded by the demand side platform and the Nielsen GRP data.

Quoting GRPs Based on MP Polarization and Viewer Polarization

When campaign reach is estimated based only on site polarization profiles, determining the available on-target inventory for a campaign is performed with respect to FIGS. 4-6. For these estimates, the process is limited to the polarization of the sites. If a site has a 60% male polarization and a campaign is targeting males, then on average it is expected that up to 40% of the impressions purchased on this site will be essentially wasted. In order to get the on-target rate above that of the sites themselves, it is necessary to also take into account the polarization of the viewers in the known viewer database, and pass over unknown viewers to focus on known polarized (or look-alike polarized) viewers.

At the same time, if the campaign passes over unknown viewers in favor of known polarized viewers, the effective available inventory could go down significantly, and with it the statistical confidence that the requirements for a campaign being estimated and quoted can be fulfilled. One solution is to mix in some unknown viewers, and the strategy for mixing can be validated by comparing GRP results with pre-campaign estimations after campaigns are run in a similar way that the Efficiency Factor is utilized per FIG. 7.

Assuming the database of known viewers—including known polarized and look-alike polarized viewers—is large enough to encompass a majority of potential viewers of a campaign, and assuming that a campaign is targeting MPs that have a reasonable degree (above 70%) of polarization for targeted VCs, mixing in unknown viewers may not dilute the campaign significantly since it would be expected that polarized viewers would be visiting the polarized MP anyway.

To get substantial benefit from known viewers, a campaign would have to pass over unknown viewers at least in the early part of the operational period or run time of a campaign. As a campaign progresses, the viewers receiving ad impressions for the campaign on targeted sites can be tracked by a system according to the invention. As long as the success rate for on-target impressions is such that the campaign is on track to be fulfilled during the allotted run time, no additional unknown viewers would need to be mixed in. If the success rate drops below this, then unknown viewers would be added in including a larger percentage of wasted impressions.

Alternately, a campaign can start by targeting a mix of known and unknown viewers and then adjust the mix during the run-time based on the success rate for on-target impressions. How the initial mix is determined can depend on the polarization probabilities for targeted sites and the quantity of known polarized and look-alike polarized viewers in the known viewer database that match the targeting criteria. Again, the correlation between GRPs estimated prior to a campaign and GRPs delivered during a campaign is validated after a campaign by comparing with GRP data such as that supplied by Nielsen. If on average there are discrepancies, then the method for determining the initial mix of known and unknown viewers can be appropriately adjusted.

Figure 8:
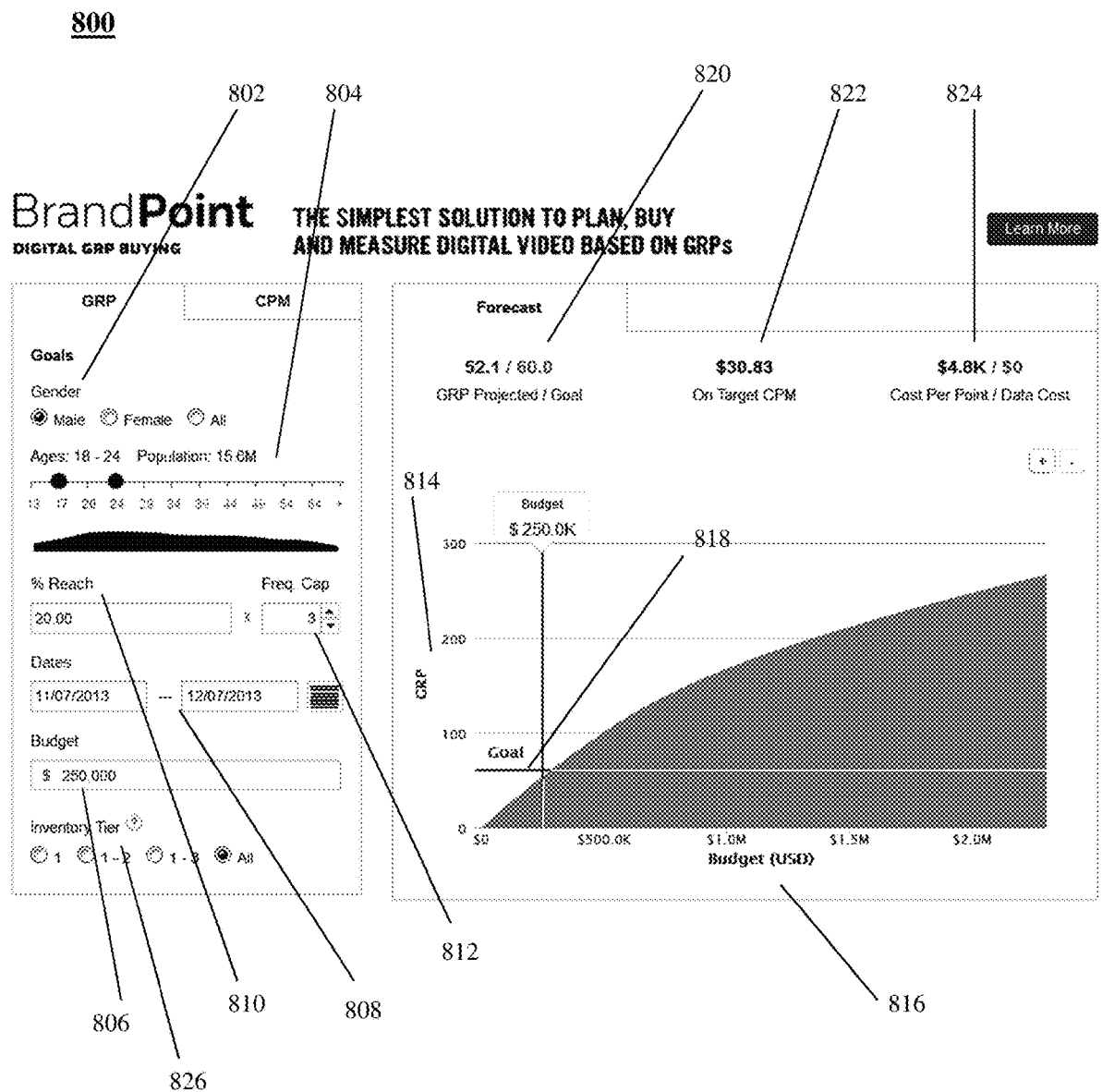
FIG. 8 shows an exemplary user interface whereby a user enters parameters that guide an online advertising campaign and is directly presented with an estimated resultant GRP quantity and an estimated cost for the campaign.

An exemplary user interface for estimating the results and cost of an online advertising campaign is shown in FIG. 8. A client/advertiser or alternately an associate of a demand-side platform enters certain parameters that affect a campaign, and according to this embodiment of the invention they are presented with an estimation of campaign results. A user may choose targeting parameters for demographic categories such as gender 802 and population segment 804. For this example, population segment 804 has been chosen to be ages 18-24 which when combined with a male segmentation 802 produces an estimated targeted population of 15.6 million potential viewers. One exemplary method for choosing the population segment 804 is shown as a user controllable graphic slider presented to a user, wherein the user manipulates a lower bound icon and an upper bound icon on the user controllable graphic slider to indicate a targeted age bracket. Further, a graph of available inventory resulting from the user's demographic inputs is also presented below the user controllable graphic slider as an aid to the user in choosing the targeted age bracket.

A target budget 806 is chosen—for this example $250,000. The user then enters a desired reach 810 for the campaign which is represented as a percentage of the target population 804, along with an allowed frequency 812 which for this example has been chosen to be equal to three. The frequency specifies a number of times an advertisement may be shown to a member of the targeted population, and be counted as an on-target impression.

Additionally, a user may choose one or more classifications or segmentations of MPs to be addressed by a campaign, herein labeled "Inventory Tiers" 826 in FIG. 8. For this non-limiting example, available classifications are shown as tiers ranging from MPs that are very well-recognized to those that are less recognizable. For example, Tier 1 can represent sites a user's friends and family would recognize. Tier 2 can represent MPs with lower brand recognition or awareness. Tier 3 can represent brand-safe sites that are niche or reach. "Brand safe" refers to MPs where there is nothing controversial such as guns, sex, violence, or alcohol, etc. "Niche" means there is a smaller audience, such as for instance a site for vegan cooks. "Reach" sites are MPs with huge audiences and many demographics such as YouTube, CBS, etc. Reach sites provide broad exposure, however with little specific brand alignment.

To provide interactive feedback to the user, a graph is generated as shown in FIG. 8 based on parameters input by the user. The graph includes GRPs 814 on one axis, and possible campaign budgets 816 required to achieve a GRP result on the other axis. The campaign goal 818 is displayed as a reference level indicated on the graph, and a forecast 820 is also shown that indicates the GRP level estimated to be achieved by the campaign during the allotted run time 808 and within the target budget 806. Also shown in forecast 820 is the GRP goal resulting from the desired reach 810 and the frequency cap 812. The estimated cost 822 for on-target impressions is shown as well as the cost per GRP 824. In addition to receiving from a user input parameters shown in FIG. 8, other parameters may be received including for example specific targeted Media Properties, targeted geographic locations, and other viewer characteristics besides gender and age such as for instance a historical tendency to view and/or purchase certain classes of product or service.

Figure 9A:
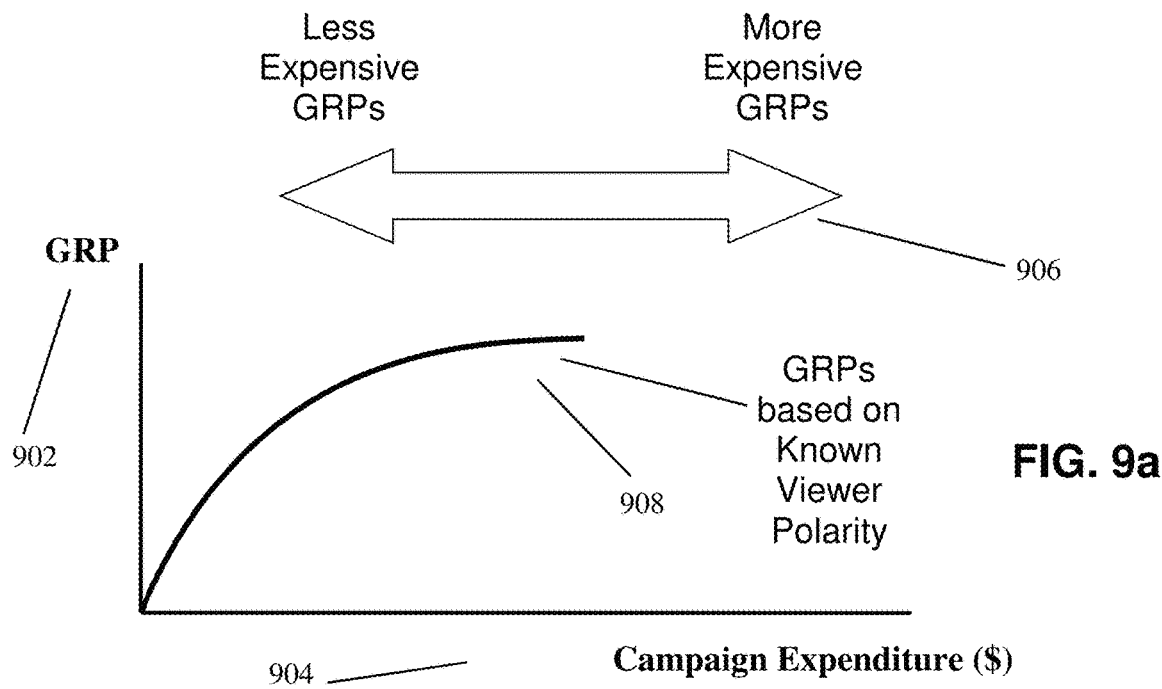
FIGS. 9a and 9b demonstrate how GRPs result as capital expenditure increases for a campaign.
Figure 9B:
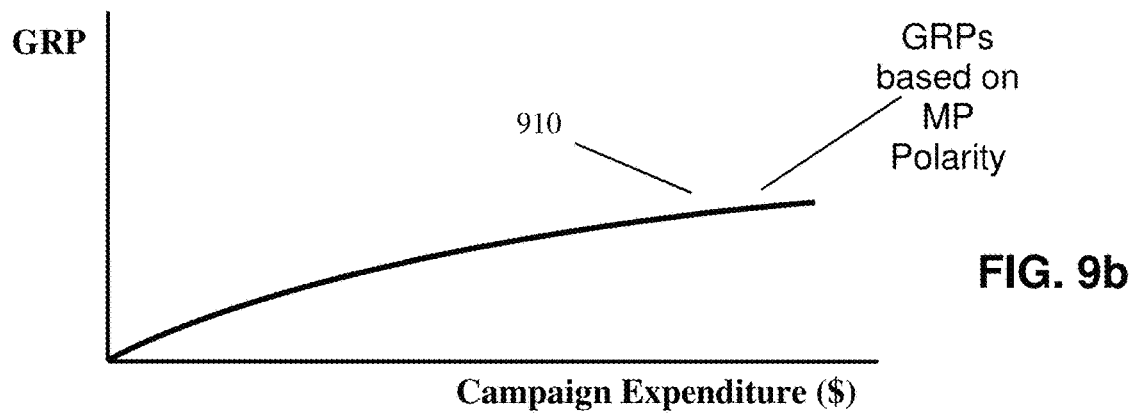

Diagrams 900 of FIG. 9 describe how the rate of GRP fulfillment varies with campaign expenditure when comparing a campaign focused on polarized viewers versus a campaign focused on polarized MPs. FIG. 9A shows GRPs 902 as a function of campaign expenditure 904 where the resultant curve 908 is for a campaign based on serving ad impressions specifically to polarized viewers. In general, ads served to polarized viewers have a higher probability of being on target when compared with ads served solely to unknown viewers visiting polarized MPs. At the same time, the available inventory of polarized viewers is typically much smaller than the available inventory of all viewers visiting polarized MPs. So, even though the rate of GRP fulfillment with capital expenditure is higher in FIG. 9A addressing polarized viewers, the inventory of polarized viewers alone may only be sufficient to fulfill smaller campaigns. Also note that as capital expenditures increase, the rates of GRP increase for curves 908 and 910 are reduced, and thus per arrow indicator 906 as capital expenditure increases GRPs become more expensive. This is due to the fact that for a very small campaign (small campaign expenditure) MPs with relatively low cost of impressions can be addressed for campaigns focused on polarized viewers, polarized MPs, or a mix of the two. When a larger numbers of impressions are required, the campaign must also address MPs with higher costs of impressions. Also note that for both curves 908 and 910, as the campaign expenditure increases, the curve eventually starts to flatten essentially providing diminishing returns for further capital expenditure. As such, it may be appropriate for some campaigns to alter the campaign strategy when a cost of impressions (cost of GRPs) reaches a certain level. Some exemplary embodiments of a campaign would start with ads served to polarized viewers until a cost of impressions reaches a level where only the most expensive inventory is being addressed, whereupon reaching that level the campaign would begin to serve ads to unknown viewers—typically viewers visiting polarized MPs. At this point in the campaign, ads could still be served to polarized viewers, or alternately ads could be served only to unknown viewers.

Figure 10:
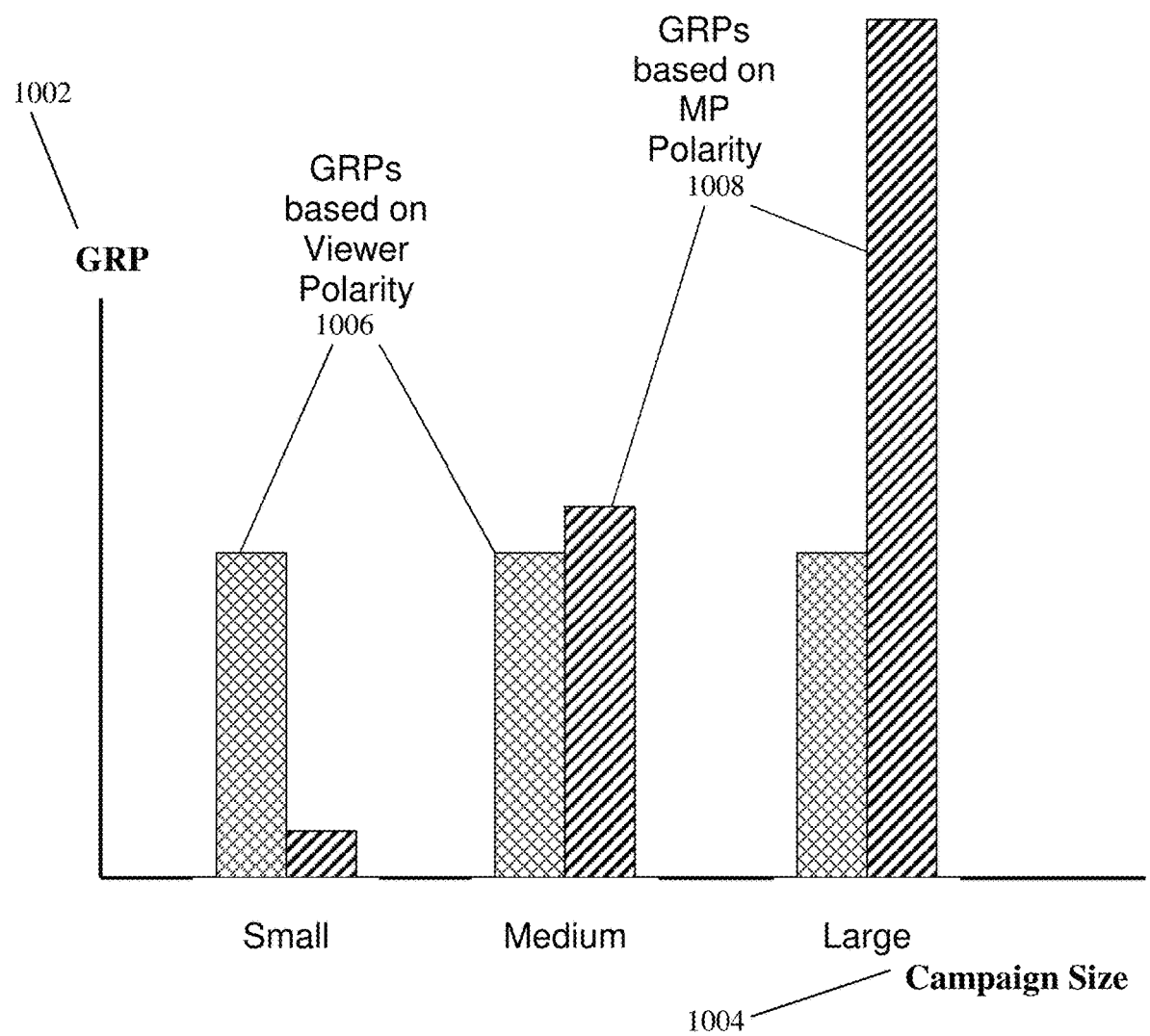
FIG. 10 demonstrates how resultant GRPs apportion between those based on polarized viewers vs. polarized MPs as the size of an online ad campaign varies.

FIG. 10 includes bar graph 1000 where resulting GRPs 1002 are shown relative to campaign size 1004. In particular, GRPs based on viewer polarity 1006 are compared with GRPs based on MP polarity 1008 as campaign size changes. Notice that for very small campaigns, serving ads to polarized viewers alone may be completely adequate to satisfy campaign requirements although a small number of GRPs based on MP polarity may be required depending upon available polarized viewer inventory that satisfies the campaign's targeting criteria. For medium-size campaigns, substantial quantities of GRPs may be required for both polarized viewers and unknown viewers visiting polarized MPs. As shown in FIG. 10 for large campaigns, GRPs will typically result from ads served to unknown viewers visiting polarized MPs.

When predicting campaign results before execution of a campaign, a system operating according to the invention will typically examine targeted viewer characteristics for the campaign and estimate an amount of available inventory of polarized viewers in the database of polarized viewers that meet targeting criteria consistent with the targeted viewer characteristics. Then, based on the required campaign size—typically the total GRPs required in a specified campaign run time—a ratio of polarized viewers served to unknown viewers served is determined. This estimate can be used in predicting campaign results prior to the start of campaign execution, and can also be used as an initial ratio of polarized viewers served to unknown viewers served at the beginning campaign execution.

Note that the available inventory for polarized viewers is also affected by the allotted run time. The estimated rate at which polarized viewers become available is historically derived, and it follows that for a shorter campaign run time fewer polarized viewers will be available compared with longer run times, all other parameters being equal. Also note that while polarized viewers may of course visit targeted polarized MPs, they may also visit other MPs and still be of interest. As such a campaign addressing polarized viewers may serve only polarized viewers visiting specifically targeted MPs, or alternately any polarized viewer with viewer characteristics matching targeting criteria, regardless of what MP they visit.

Figure 11:
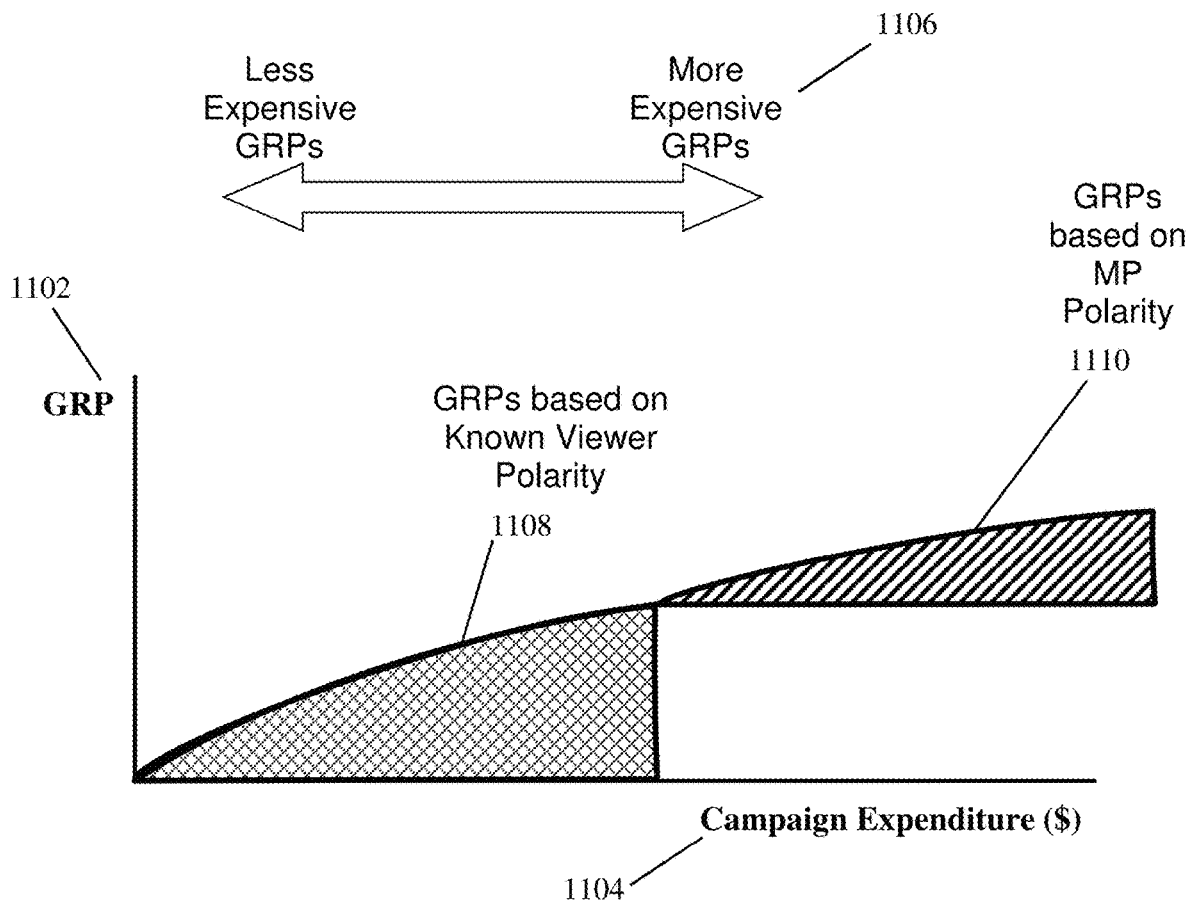
FIG. 11 describes how GRPs result from a campaign that starts by addressing only polarized viewers, and transitions to a campaign that only addresses polarized MPs.

FIG. 11 shows an exemplary campaign strategy where GRPs 1102 are shown as campaign expenditure 1104 increases, with arrow 1106 indicating that GRPs become more expensive as the campaign progresses, and as less expensive GRPs are no longer providing sufficient numbers of impressions per time. This assumes that it is included in the campaign strategy to pass over impression opportunities early in a campaign for MPs which are known to be more expensive, in favor of serving ads to viewers visiting MPs for which ad impressions are less expensive. For the exemplary strategy shown in the graph of FIG. 11, it has been determined that the available inventory of polarized viewers meeting the campaign criteria is large enough that the campaign should start by initially serving only polarized viewers 1108. It is also assumed that less expensive GRPs will be focused on in the initial stage of campaign execution. Then, according to this exemplary strategy a transition is made during the campaign runtime to switch from addressing GRPs based on viewer polarity 1108 to GRPs based on MP polarity 1110. This transition can be triggered by one or more criteria, including the cost of impressions having reached a specific level, or alternately the rate of GRPs fulfillment being determined to be below that required to complete the campaign requirements during the allotted campaign run time.

Figure 12:
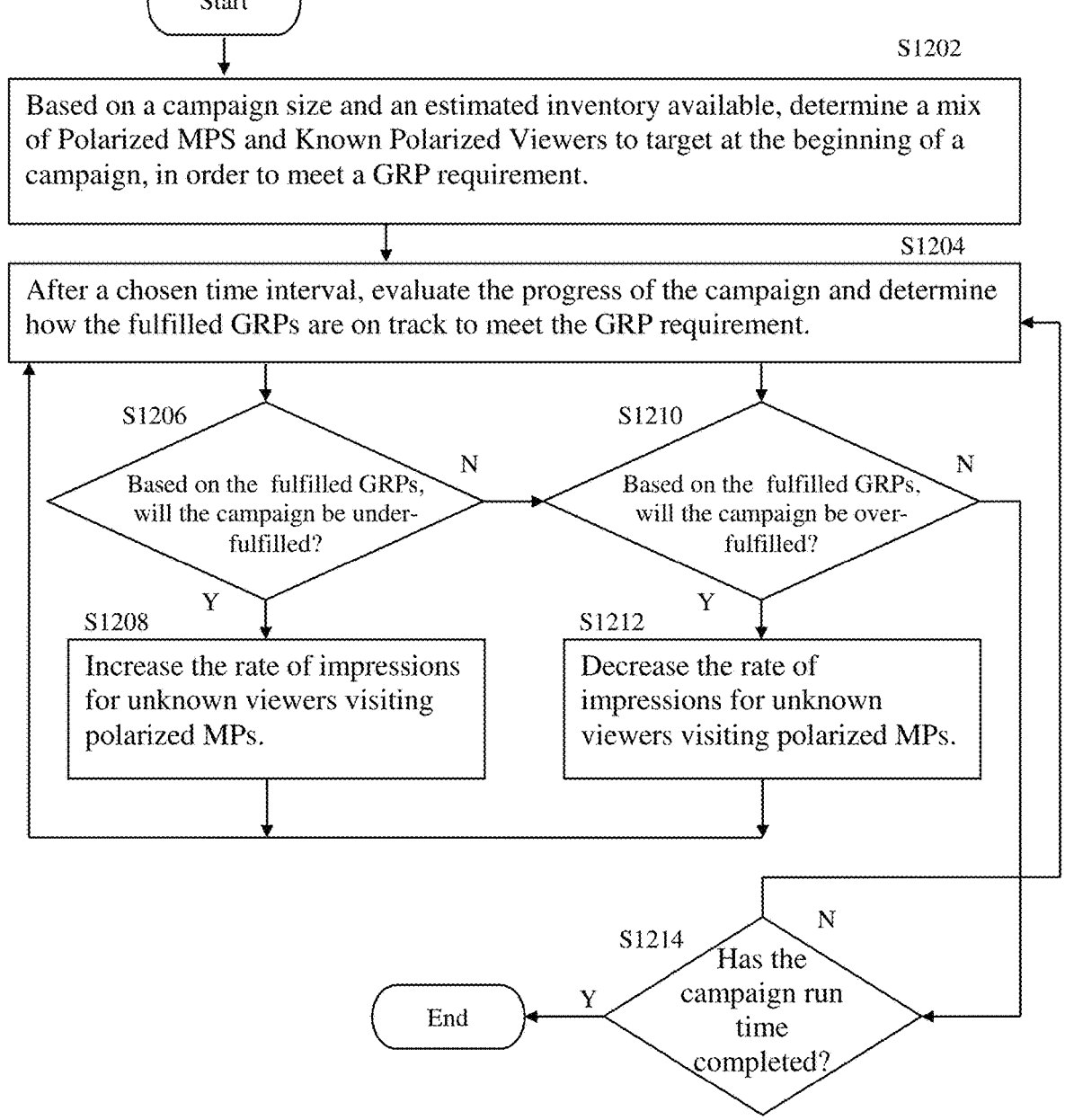
FIG. 12 shows a flow chart describing an exemplary process where both polarized viewers and polarized MPs are addressed from the start of a campaign, and then the ratio of polarized viewer impressions to polarized MP impressions is altered from time to time according to an estimation of campaign results at the end of the campaign run time.

FIG. 12 shows a flowchart 1200 wherein both polarized viewers and unknown viewers visiting polarized MPs are targeted from the beginning of a campaign. Then, according to flowchart 1200, the ratio between targeted polarized viewers and unknown viewers is adjusted during the course of the campaign in order to fulfill the campaign in the allotted runtime. This strategy provides an optimum number of on target impressions by initially focusing on polarized viewers as much as possible. According to step S1202, an initial mix or ratio of polarized viewers to unknown viewers visiting polarized MPs is determined. This initial mix or ratio is based at least in part on a required campaign size (GRPs required) and an estimated available inventory. A specified campaign run time may also be considered in determining the initial mix or ratio. In step S1204, after a chosen time interval, a system implementing the invention evaluates the progress of the campaign and determines if the rate of GRP fulfillment is on track to meet the GRP requirements for the campaign. In step S1206 it is estimated based on GRPs fulfilled thus far if the campaign will be under-fulfilled. If so, per step S1208 the rate of ads served to unknown viewers visiting polarized MPs will be increased. If not, per step S1210 it is estimated based on GRPs fulfilled thus far if the campaign is likely to be over-fulfilled. If so, per step S1212 the rate of ads served to unknown viewers visiting polarized MPs is decreased. If not, then per S1214 it is determined if the campaign run time has been completed. If the run time has not yet completed, then the process reverts to step S1204. If per step S1214 the campaign run time has completed, then the campaign is over and the results are typically reported to the advertiser/client by the demand-side platform.

Also when the campaign has completed, the actual GRPs delivered during the campaign may be obtained from a third party and compared with any estimates for GRPs that were made prior to the start of the campaign. From this comparison, an efficiency factor is determined which is utilized in future campaign predictions and any price quotations that may result as described earlier with respect to FIG. 8.

Viewer Signatures

Signatures for viewers are the result of collecting information about a viewer's online viewing activity over time. At one level, viewing activity consists of the different websites or MPs (Media Properties) that are visited by a viewer and where the viewer is offered an online advertisement as a result of an online media auction. At another level, viewing activity can also consist of a viewer's engagement activity with an MP—for example actions they take upon being presented an advertisement and products or services they buy after viewing an advertisement. Furthermore, attributes of the MPs that a viewer visits such as verticals—categories from a predefined hierarchy (for example: Automotive; Art & Entertainment) either specified by the publishers or automatically assessed via text categorization algorithms.

The following are some example signatures for MPs visited by two exemplary viewers:

Viewer 1: espn.com, nba.com, sports.com, IAB-230, Google-Vertical-54

Viewer 2: vogue.com, fashion.com, babies.com, IAB-432

Signatures such as these provide information that, when analyzed as described herein, determines a variety of demographic segments that a viewer falls into, and further determines a probability that the viewer belongs to each of those segments. Information such as shown above for Viewer 1 and Viewer 2 can help determine not only that Viewer 1 is probably male and Viewer 2 is probably female, it can also assist in determining an age bracket for each of the viewers as well as certain behavioral segments, for instance "sports fans" for Viewer 1, and "fashion conscious" for Viewer 2.

Truth Set Viewers

A "truth set" or "set of viewers with truth" is a control set of viewers where the values for each specific demographic characteristic is known. Truth information on viewers is usually gathered or obtained from sites where viewers register in order to participate, and in the process of registering provide specific demographic information about themselves. Observing and recording the viewing behavior of truth set viewers provides information that is used to create models that are each focused on a particular demographic segment or category, those models being later used to categorize unknown viewers.

More Demographic Categories

Previously in this specification, polarization analysis of both MPs and viewers was described. Typically, this analysis determined with some probability the extent to which a viewer was male or female, and to some extent the degree to which a viewer could be placed in an age bracket. It is useful, however to provide a much more granular analysis capability and place targeted viewers into a wider variety of categories, doing so while assigning probabilities for a viewer with respect to belonging to each category. In particular, it is useful in targeted advertising to have a high degree of granularity for age bracketing. Examples of granular gender/age brackets:

Female 25-54; and

Male 18-24

In addition to gender and age brackets, analysis can be likewise performed to determine the extent to which a viewer belongs to one or more of certain behavioral segments, for example:

Fashion;

Outdoor Sporting Goods; and

Automotive

Further, additional demographic categories can include for example:

Income bracket;

Married/Unmarried;

Number of children; and

Ethnicity

Ad and site (MP) interaction behavior can also be categorized and targeted by campaigns. For example, such categories can include viewers who are more apt to watch a video to completion, click-thru on an ad, take a survey, purchase a product or service, etc. Another category that can be observed and targeted are "Intenders", for example viewers that have stated that they intend to buy a product (autos, electronics, etc.), typically within a specific time frame.

Building Categorization Models from Truth Set Viewer Signatures

Figure 13:
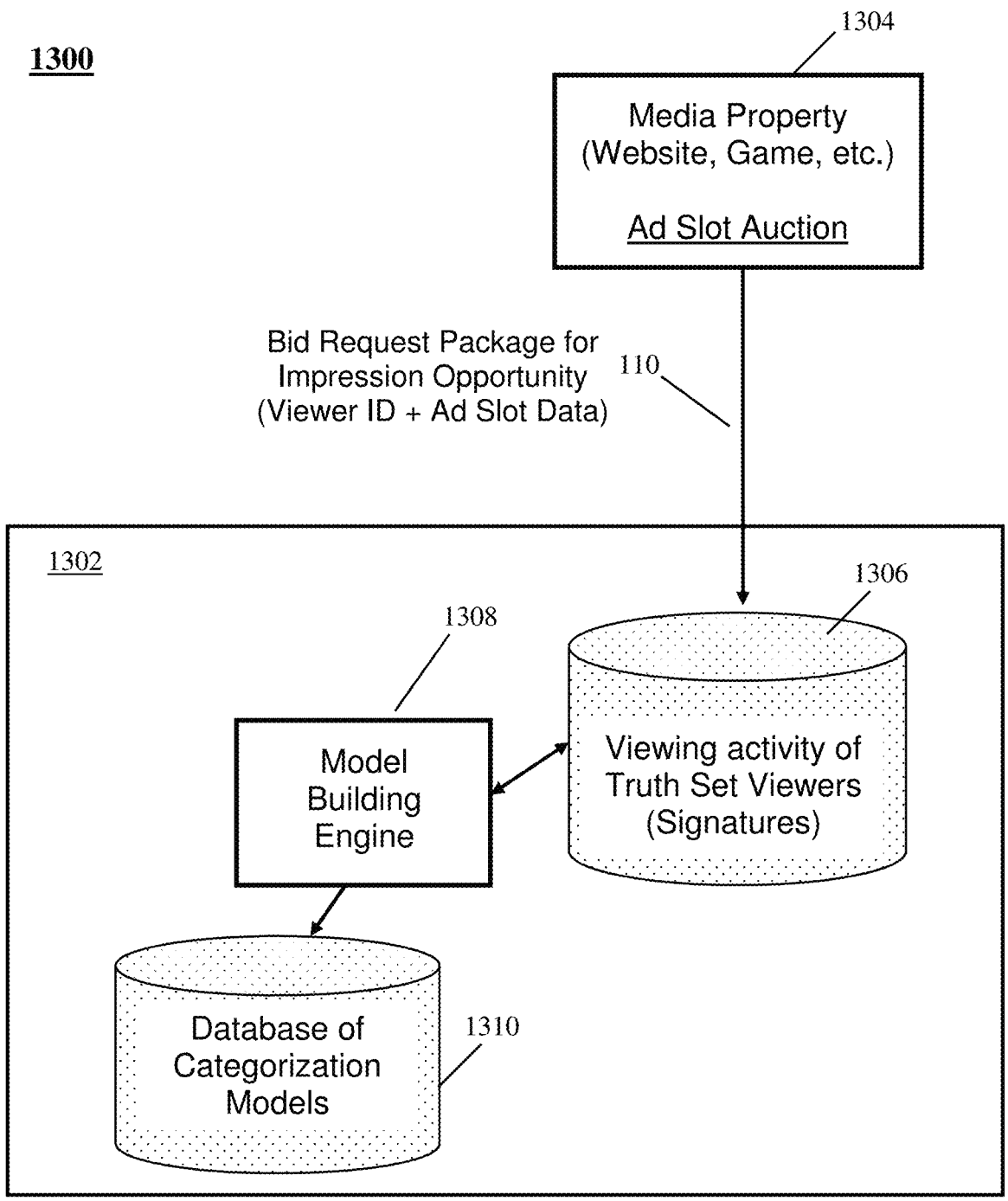
FIG. 13 shows a data flow diagram for an exemplary process where viewing activity of truth set viewers with known demographic characteristics is recorded to produce a "signature" for each truth set viewer, followed by analyzing the recorded signatures to build models that are later used for categorizing unknown viewers.

Once a database of truth set viewers has been acquired or established, viewing activity of these truth set viewers is observed over time as shown in data flow diagram 1300 of FIG. 13. Here, MPs 1304 provide bid request packages 110 for impression opportunities to a demand-side platform 1302 where the viewing activity over time of truth set viewers is observed and recorded in database 1306. These are the "signatures" for the truth set viewers. This signature database 1306 is then processed by model building engine 1308 to produce a database of categorization models 1310. Model building engine 1308 may comprise for example any of a number of machine learning analysis engines known in the art, including for example but not limited to Decision Trees and Ensembles, Neural Nets, Deep Neural Nets, Support Vector Machines, K-Nearest Neighbors, and Bayesian techniques. Once the database of models 1310 has been constructed, unknown viewers can then be categorized relative to a spectrum of specific demographic categories as described for example above. For each demographic category segment, a specific model is generated. Thus, there will be as many models as there are demographic category segments of interest.

Figure 14:
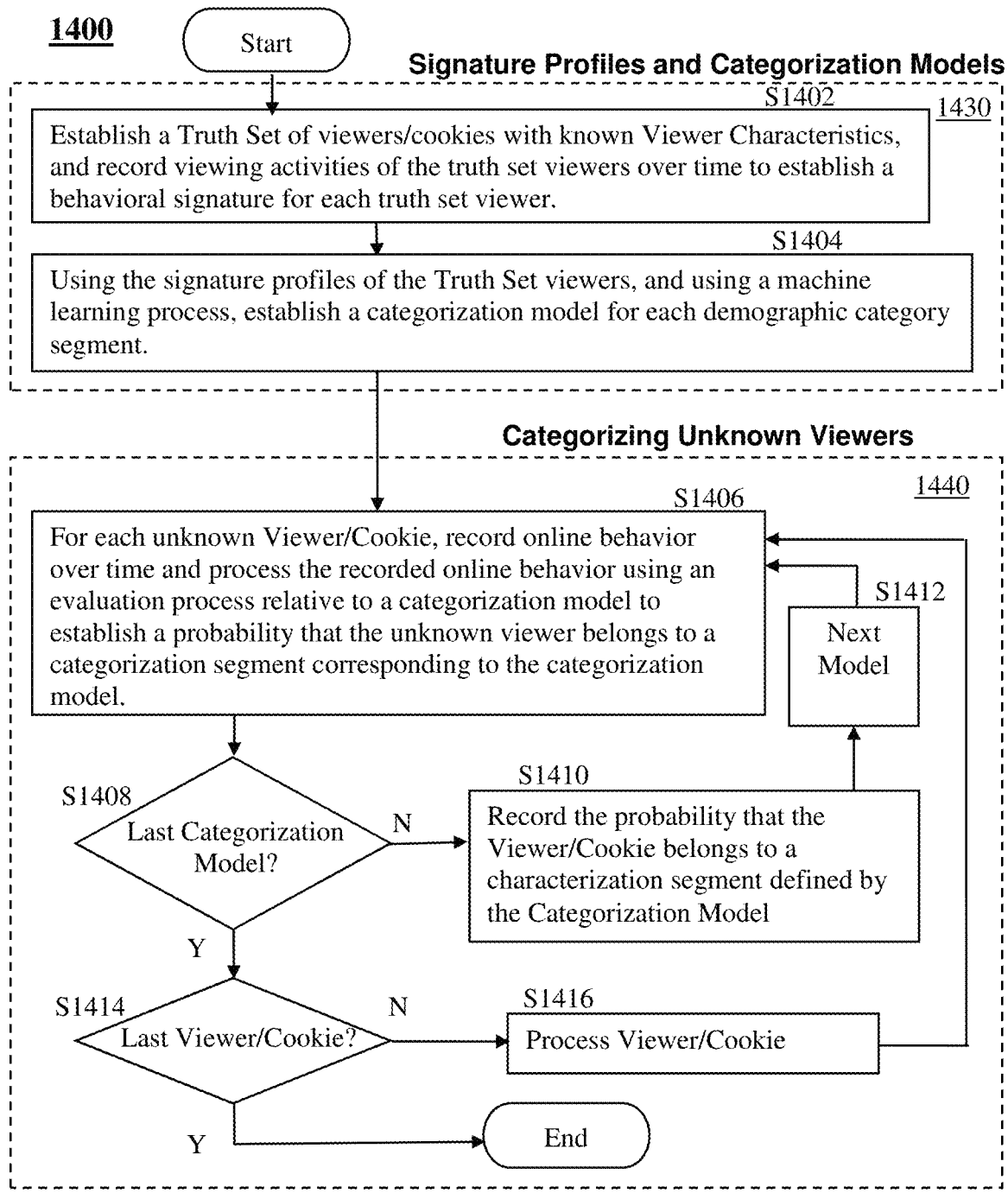
FIG. 14 shows a flow chart for an exemplary process including building models based on the activity of truth set viewers, and using those models to categorize unknown viewers.

The process of recording signature profiles for truth set viewers and building categorization models is further described in beginning process 1430 of flowchart 1400 shown in FIG. 14. In step S1402, a truth set of viewers and their cookies is established whereby the viewer characteristics for the truth set viewers is known. Then over a period of time, viewing activities of the truth set viewers is observed and recorded in order to establish a behavioral signature for each truth set viewer. In step S1404, these signature profiles for the truth set viewers is analyzed using a machine learning process in order to establish a categorization model for each demographic category segment that may be targeted in any future online advertising campaign.

Categorizing Unknown Viewers

Once a set of characterization models has been established using a machine learning process as described above, an unknown viewer can be characterized to determine which demographic segments they belong to, and for each segment, what the probability is that they belong to that segment. This process is repeated frequently for millions of unknown viewers since the typical life of a cookie is a relatively short period. The categorization process is described by process 1440 of FIG. 14. In step S1406, for each unknown viewer/cookie their online behavior over time is recorded, and then this online behavior is processed relative to each categorization model to determine which demographic segments a particular viewer belongs to, and what the probability is that they belong to a particular segment associated with a particular model. For each unknown and uncharacterized viewer, the process continues until the viewer has been evaluated relative to each categorization model. Per step S1408, until the last categorization model is evaluated, the process proceeds to step S1410 where the probability that the viewer/cookie belongs to a categorization segment is recorded, followed by moving ahead to the next categorization model per step S1412. When the last categorization model has been evaluated for a particular viewer, the process proceeds to step S1414. If more viewers remain to be characterized, per step S1414 it is determined to proceed to S1416 and process the next unknown viewer/cookie for categorization relative to demographic segments. When per step S1414, it is determined that the last unknown and uncharacterized viewer has been processed and characterized, the process ends for the moment. When enough time has passed, due to the expiration of cookies it is eventually necessary to start process 1440 again in order to have enough characterized viewer inventory for online advertising campaigns.

Figure 15:
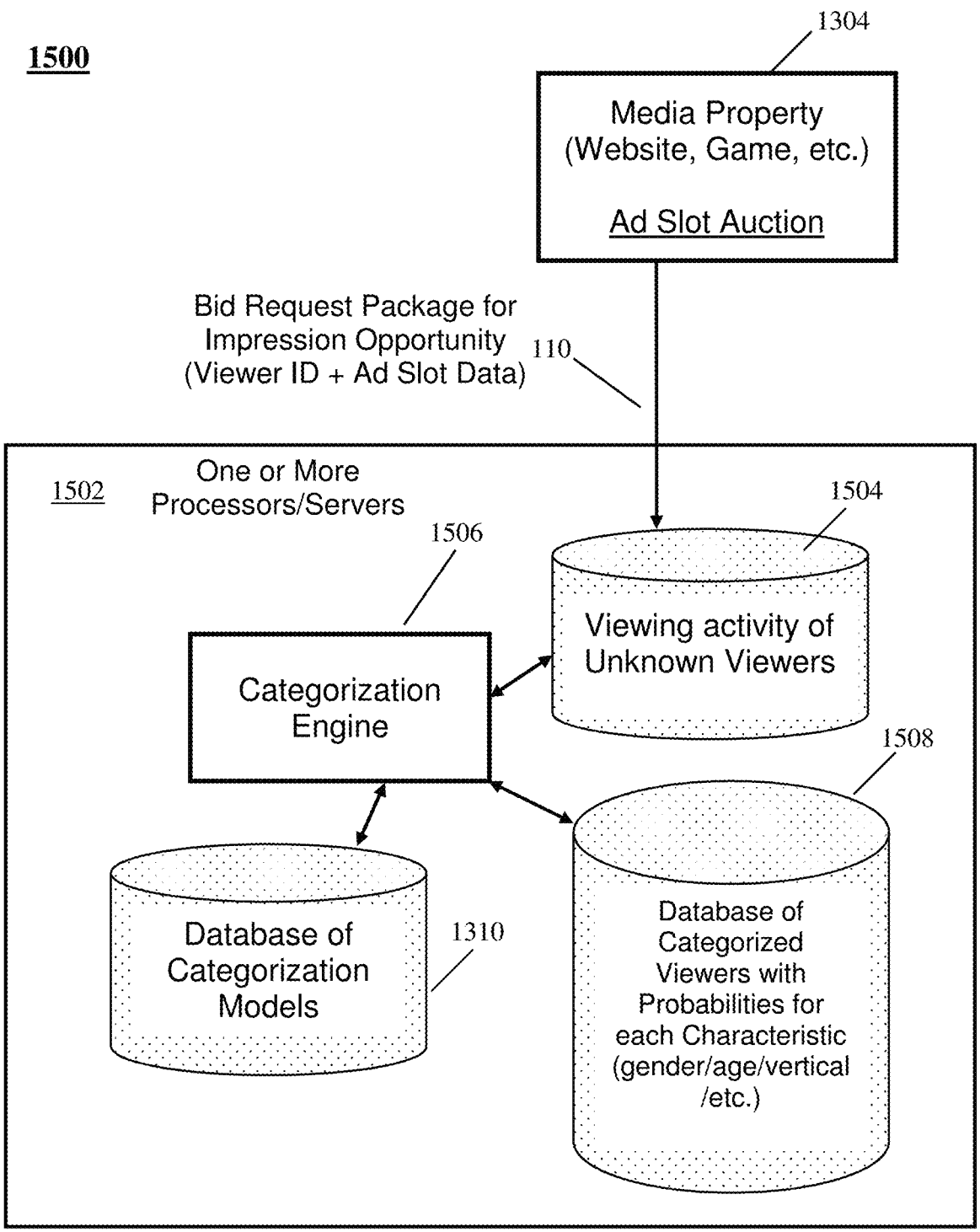
FIG. 15 shows a data flow diagram for an exemplary process where models created based on truth are used for categorizing unknown viewers to produce a database of categorized viewers including a probability that each individual viewer belongs to a particular categorization segment.

Data flow diagram 1500 includes process 1502 for categorizing unknown viewers and is shown in FIG. 15. Here, as bid request package 110 is supplied to a demand-side platform for possible bidding for an online ad slot on media property 1304, that MP is recorded for that viewer in a database 1504 containing viewing activity of unknown viewers who have yet to be characterized. After enough viewing activity has been accumulated for the viewer, categorization engine 1506 then processes a viewer's viewing activity with respect to a plurality of categorization models 1310 which were previously created by the process described with respect to FIG. 13 and process 1430 of FIG. 14. The categorization engine 1506 determines for each model a probability that a viewer belongs to a demographic segment targeted by that particular model. When process 1502 has been completed for all unknown viewers, database 1508 has been created containing all categorized viewers including the probabilities for each viewer relative to each demographic categorization segment that they may be a member of.

Using Viewer Categorization Probabilities in Bidding

Figure 16:
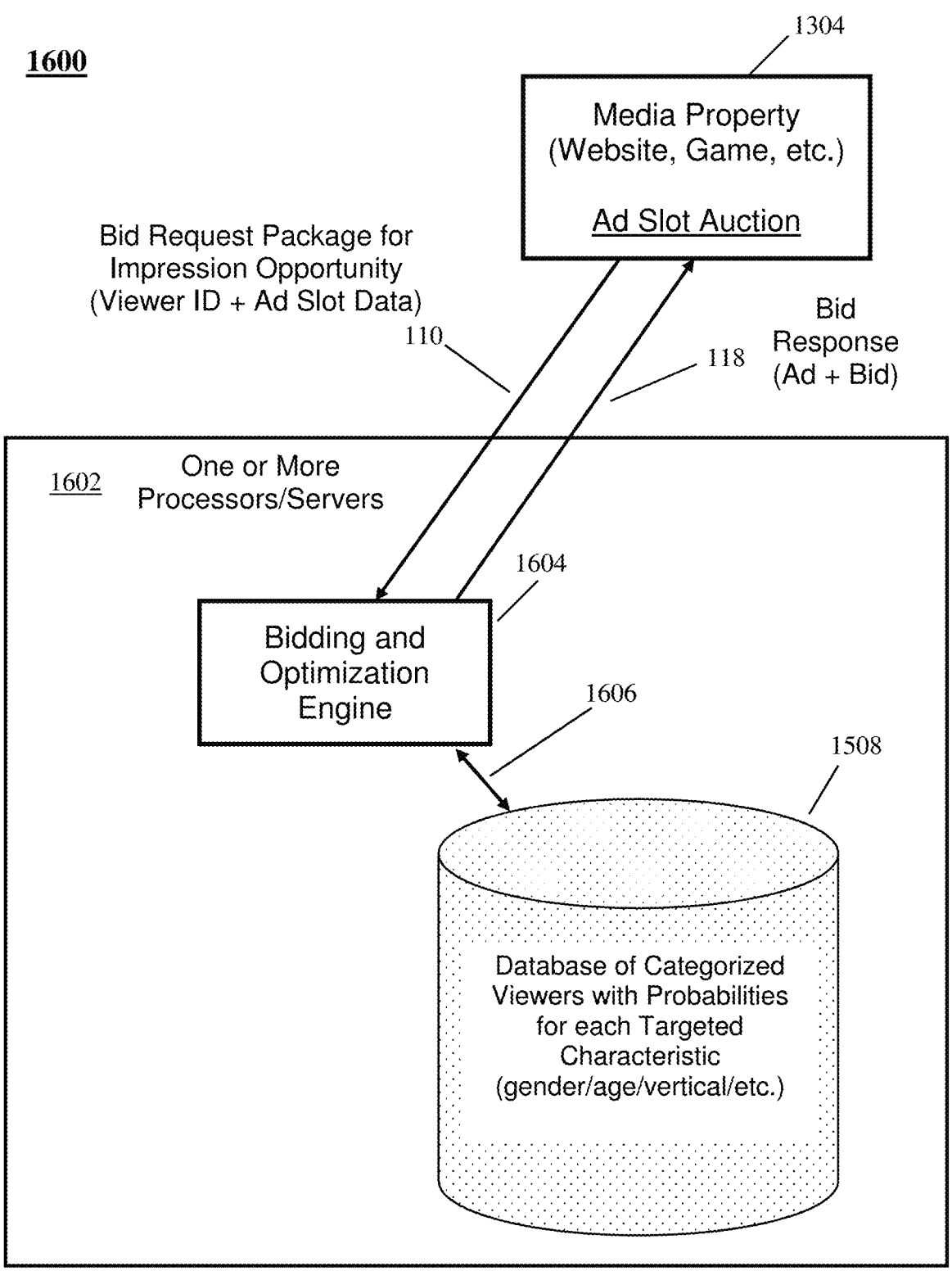
FIG. 16 shows a data flow diagram for an exemplary process where the database of categorized viewers, including probabilities that an individual viewer belongs to a particular categorization segment, is used in the bidding process to increase the probability that ads are delivered on target.

The modeling processes described herein based on machine learning enable viewers to be characterized more accurately relative to belonging to targeted demographic segments. This more accurate targeting is used in the bidding process for online ad opportunities in order to enable campaign budgets to be used more effectively. Data flow diagram 1600 of FIG. 16 describes data movement during the bidding process. A media property 1304 provides a bid request package 110 for an impression opportunity that includes a specific viewer's ID and data for the ad slot related to the opportunity. This is received within system 1602 according to the invention including one or more processors which implement a bidding and optimization engine 1604 which communicates 1606 with database 1508 containing information related to categorized viewers, including probabilities for each demographic characteristic related to each viewer. These characteristics may include not only gender and age bracket, but also behavioral segments and other categories as mentioned earlier. Based on the database of categorized viewers 1508 and other control inputs as well as control processes described herein, bidding engine 1604 supplies a bid response 118 to MP 1304.

Figure 17:
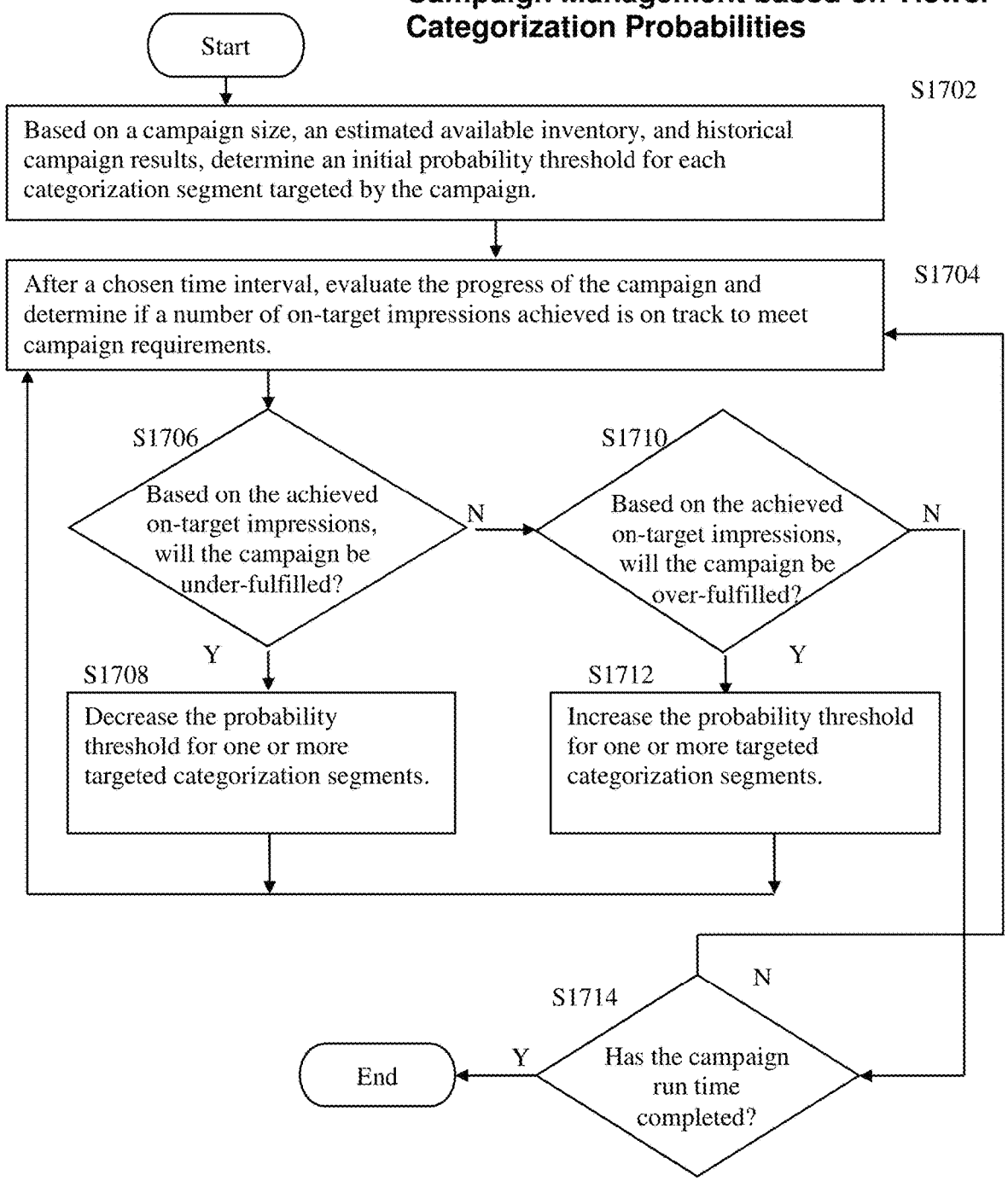
FIG. 17 shows a flow chart for an exemplary process where probabilities that viewers belong to particular demographic cauterization segments are used in the bidding process for an online advertisement auction.

An exemplary and non-limiting process for describing bidding functionality during an active advertising campaign is shown in flowchart 1700 of FIG. 17. A campaign may be operated with static thresholds relative to probabilities that a viewer belongs to certain demographic segments. This may suffice for some campaigns, however a campaign may be further optimized by adjusting probability threshold values dynamically during the execution of a campaign. If the campaign progress is not proceeding at a pace whereby the campaign will fulfill its impression targets by the end of the defined runtime, there are a number of options that may be pursued in dynamically managing the campaign. If more impression opportunities are needed per time, one option is to include unknown viewers who are visiting MPs where the MP has polarization characteristics in line with some of the campaign targeting guidelines. However, another option is to adjust probability threshold values for known and previously characterized viewers relative to certain demographic characteristics, or all demographic characteristics, in order to increase the number of impressions delivered by the end of the campaign. If the campaign is achieving on-target impressions at a rate higher than was anticipated in pre-campaign estimations and is therefore on target to over-fulfill the campaign during the prescribed runtime, the probability threshold value(s) may alternately be increased, thereby slowing the rate of impression fulfillment and at the same time increasing the targeting accuracy for the campaign.

A single probability threshold value can be determined and then applied to all demographic characteristics, or alternately, probability threshold values for some characteristics may be set higher or lower than for others. In step S1702 of FIG. 17, in an exemplary and non-limiting embodiment an initial probability threshold value is determined for each demographic categorization segment targeted by the campaign. For example, a particular advertiser may need to target a very specific and narrow age bracket, however at the same time may not be as concerned with the gender of a viewer, favoring females over males but by a small margin. In this case, the probability for the age bracket may be set to a higher value than the probability that the viewer is female. Also, different strategies are possible relative to responding to an impression opportunity, based on probabilities that the viewer belongs to various demographic segments. One decision may be to simply bid or not bid. Another decision may affect the actual amount to be bid in the auction for the impression opportunity. Thus, for some embodiments of the invention, for a single demographic characteristic a threshold determining whether to bid or not may comprise a first probability threshold value, while the determination of the actual bid amount may be based on a second probability threshold value.

In step S1704 after a time interval the progress of the campaign is evaluated and it is determined if the quantity of on-target impressions achieved to that time is on track to meet campaign requirements by the end of the campaign runtime. If per step S1706 it is determined that the campaign is on track to be under-fulfilled, then the probability threshold value for one or more targeted categorization segments may be decreased per step S1708. If however, per step S1710, based on the achieved on-target impressions to that point it is determined that the campaign is on target to be over-fulfilled, it may then be appropriate per step S1712 to increase the probability threshold value for one or more targeted campaign segments, thereby reducing the rate of impression fulfillment and at the same time increasing the targeting accuracy. Then, per steps S1706 and S1710 it is determined that the campaign is on track to be properly fulfilled in the specified runtime, and the process proceeds to step S1714 to determine if the runtime has completed. If so, then the process ends along with the campaign, and if not, the process returns to step S1704 to again determine how the campaign is progressing relative to the rate of fulfillment.

Using Viewer Categorization Probabilities in Estimating Campaign Results

Earlier in this specification and with respect to polarized viewers, it was disclosed that in predicting campaign results before execution of a campaign, a system operating according to the invention may examine targeted viewer characteristics for the campaign and estimate an amount of available inventory of polarized viewers in the database of polarized viewers that meet targeting criteria consistent with the targeted viewer characteristics. Then, based on the required campaign size—typically the total GRPs required in a specified campaign run time—a ratio of polarized viewers served to unknown viewers served is determined. This estimate was used in predicting campaign results prior to the start of campaign execution, and also used at times as an initial ratio of polarized viewers served to unknown viewers served at the beginning of campaign execution.

While the exemplary user interface of FIG. 8 allows a user to select different inventory tiers for inclusion in a campaign, a variation on this user interface in keeping with the teachings of FIGS. 9-11 herein would allow users to select different categories of polarized viewers for inclusion. Benefiting from the categorization models of FIGS. 13-15, and the resultant ability to create a large database of categorized viewers with probabilities of belonging to different demographic segments, an inventory of viewers with a probability of having certain characteristics above certain thresholds can be estimated. Also, the MPs visited by those viewers is recorded and used in targeting. Thus, an additional probabilistic capability per FIGS. 13-15 can be included in a user interface such as that shown in FIG. 8 to estimate results in terms of on-target-impressions and GRPs (Gross Rating Points) with more accuracy. Also, as described earlier for embodiments related to MP and viewer polarization, estimations constructed using database 1508 can be reconciled with $3^{rd}$ party data after the close of campaign to determine accuracy, and also to produce historical efficiency factors that may be used in future campaigns to enhance the accuracy of pre-campaign estimations.

Also, the same user controls offered to a user (client/advertiser) for estimation before a campaign can be used to drive bidding during a campaign. As mentioned earlier, the probability threshold value for determining bidding can be a single threshold value for all viewer demographic characteristics, or can be different threshold values for different viewer characteristics. If different, the user interface of FIG. 8 can be modified to add for example a set of slider bars, one for each viewer characteristic or demographic segment. The position of each slider represents a probability for the specific demographic characteristic. Then, the user can set the sliders to choose higher probability threshold values for characteristics that are most important to their campaign, and lower probability threshold values for characteristics that are less important to their campaign. The probability threshold values are used as initial probability threshold values, and can be maintained throughout a campaign, or alternately adjusted—raised or lowered—automatically during a campaign as described herein. These initial values can be set or pre-determined by either a client/advertiser, or by a demand-side platform on behalf of a client/advertiser. These probability threshold values can then be used to determine whether to bid of not, or to control bid price amounts. In yet another embodiment, a set of sliders or control inputs could be included in a user interface for determining whether or not to bid, and another set of sliders or control inputs could be included for determining bid prices. Further, in all of the above cases the parameters initially set by sliders or control inputs can be automatically adjusted during a campaign to either increase or decrease the rate of campaign fulfillment—the rate that on-target impressions are accomplished.

Pacing a Campaign Using a PID Controller Engine

Systems and methods are also disclosed for controlling a pace or spending rate for an online advertising campaign over the course of a desired campaign runtime. This invention uses a PID Controller engine to provide a desired distribution of ad placements, including spending a campaign budget over a prescribed campaign runtime, while producing optimum results in a cost efficient manner based on desired targeting parameters. Those parameters may include one or more probabilities that a viewer associated with an ad impression opportunity: belongs to one or more targeted demographic categories, will convert with respect to a product or service being offered; has an intention to buy the product or service; or exhibits one or more defined behaviors. These probabilities are determined by a truth-based machine-learning modelling engine.

Historically, a PID Controller is actually an electrical or electro-mechanical process controller that relies on a feedback loop to regulate operation of a system. Originally developed for engine speed controls in the 1890s, PIDs were next used to control steering on ships in the early 1900s. According to Wikipedia.org, a PID Controller (Proportional-Integral-Derivative Controller) is a control loop feedback mechanism (controller) commonly used in industrial control systems. A PID controller continuously calculates an "error value" as the difference between a measured process variable and a desired setpoint variable. The controller attempts to minimize the error over time by adjustment of a controlled variable, such as the position of a control valve, a damper, or the power supplied to a heating element, to a new value determined by a weighted sum.

Figure 18:
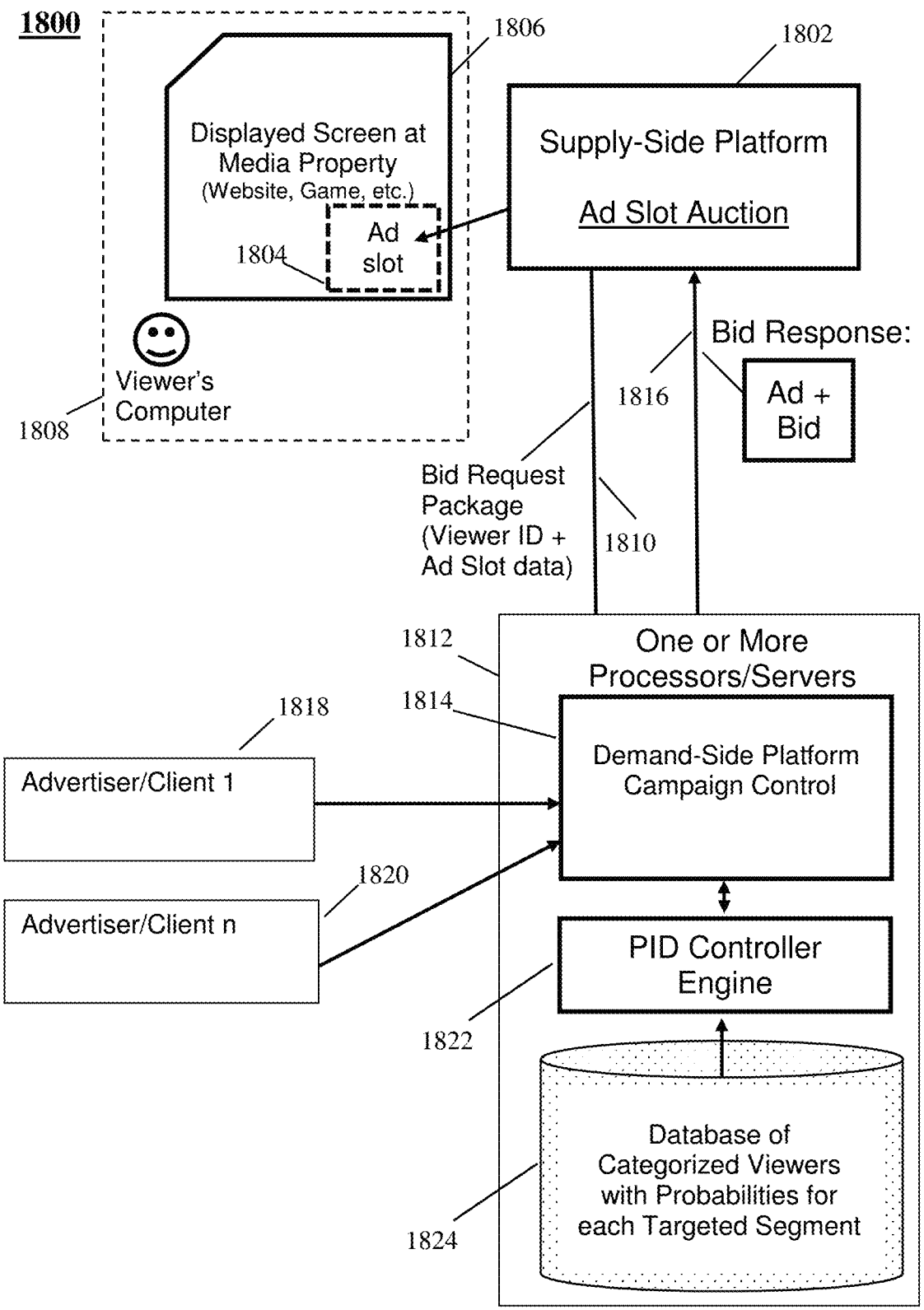
FIG. 18 shows an overview block diagram showing system components and data flow according to the invention with respect to using a PID Controller Engine to operate an advertising campaign.
Figure 19:
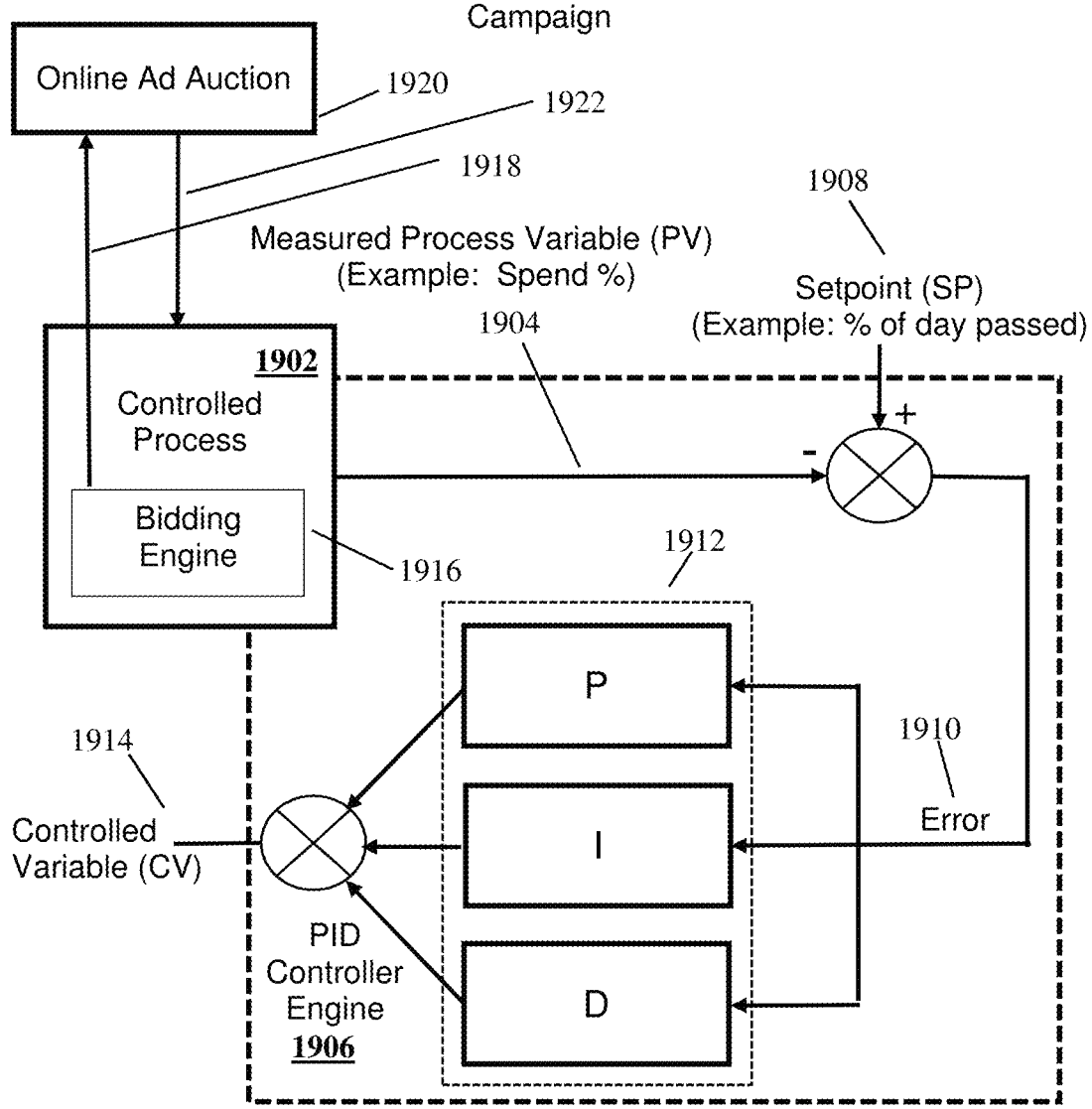
FIG. 19 shows a diagram showing the use of a PID Controller Engine as a key element in operating the invention.

For the present invention, as shown in FIGS. 18 and 19 a PID Controller functionality is implemented by a programmed engine (sequential machine) running on one or more processors to operate a functionality similar to a traditional PID controller, but for a considerably different purpose—that of balancing performance and delivery for realtime online ad campaigns. One exemplary and non-limiting goal of a PID controlled advertising campaign is to achieve a desired pacing—effectively the spending rate for the campaign.

An overview data flow diagram 1800 for the invention with respect to the use of a PID Controller Engine is shown in FIG. 18. Per FIG. 18, an ad slot impression opportunity 1804 on a webpage 1806 offered on an exemplary media property by Supply Side Partner 1802 is offered in an auction for the impression opportunity. Here, an advertisement is to be placed in ad slot 1804 on webpage 1806 to be viewed by a specific viewer 1808. Supply Side Partner 1802 sends a bid request package 1810 consisting of viewer identification information for viewer 1808 and criteria specific to ad slot 1804. This bid request package is received on one or more servers 1812 where the demand-side platform 1814 operates, and where the received information is processed thereon. Subsequently, if the impression opportunity fits the targeting criteria of one or more advertiser clients 1818-1820, the demand-side platform will respond with a bid response 1816 which includes the advertisement itself as well as a bid price. The decision to bid or not bid is controlled according to embodiments of the invention, and at least in part by a PID Controller Engine 1822, which may include a bidding engine 1916 (see FIG. 19). For certain embodiments of the invention, PID controller engine 1822 is responsive to a database 1824 of categorized viewers with probabilities that a viewer belongs to one or more targeted segments. Other probabilities may also influence the operation of the PID controller engine 1822, as will be described.

Pacing an Online Advertising Campaign

For each ad campaign placement, there is a set daily budget. In order for a campaign placement to be delivering, it should be spending its entire daily budget every day. Ideally, a placement should spend its budget evenly throughout the day, which introduces a concept called pacing. If a campaign placement is "under pace," it has spent a smaller percentage of its daily budget than the percentage of time that has passed in the day. For instance, if half of a day has gone by, but the placement has only spent $200 when the daily budget is $1,000, it is behind pace. Being "over pace" is the exact opposite, where the campaign has spent a greater percentage of its daily budget than the time that has passed that day.

PID Controller Engine Adapted to Online Advertising

As shown in block diagram 1900 of FIG. 19, a PID Controller Engine 1906 has two variables, a measured process variable 1904, and a controlled variable 1914. For the measured process variable, there is a desired value called the setpoint 1908. The PID controller continuously calculates the error 1910 between the measured process variable and the setpoint, and then adjusts controlled variable 1914 as a response based on functionality within the PID Engine core functionality 1912 including generation of one or more of proportional (P), integral (I), and derivative (D) terms. As the controlled variable is adjusted, the controlled Process 1902 operates in response, including bidding decisions made by bidding engine 1916. Measured process variable 1904 then reacts which completes the feedback loop. Although historically the setpoint of a PID Controller is kept constant for most process control applications, for controlling the pace of an advertising campaign the setpoint is also frequently changed over the course of a day or over the campaign to reflect the percentage of a day or campaign that has passed. Thus for this application, the setpoint may also be considered a variable. Note per FIG. 19 that bidding engine 1916 within controlled process 1902 sends bids 1918 to online auction 1920. Auction results 1922 are then returned to controlled process 1902 including whether the auction was won and the price that was actually paid. Thus controlled process 1902 can keep track of accumulated spending and can compute the value of Measured Process Variable 1904, which for this non-limiting example of the invention is equal to a spend percentage of the budget for the campaign.

As an example, assume the measured process variable to be spend percentage, while the controlled variable is the bid price. This means that the setpoint at any point in a day is equal to the percentage of the day that has passed (if half of the day has passed, the setpoint is 50% because ideally half of the daily budget is spent). The PID Controller Engine allows pacing to be maintained throughout the day, while bidding the smallest amount possible per auction. As auctions come in and the placement bids, the PID Controller continuously checks whether the campaign placement is pacing correctly and adjusts the bid price accordingly if it is not. As an example, say the current bid is at $8.00, but the campaign is over pacing by 20% (i.e. 50% of the day has passed, but 70% of the budget has been spent). The PID Controller receives this data and sees that the campaign is spending too much, so it adjusts the current bid price down to $7.00. After a while, the PID controller receives data that the campaign is under pace by 10% due to this change, so it readjusts the bid price up to $7.50. After many iterations of this feedback loop, the PID controller oscillates the bid price up and down until it stabilizes at the lowest price possible that allows the placement to stay on pace.

Figure 20:
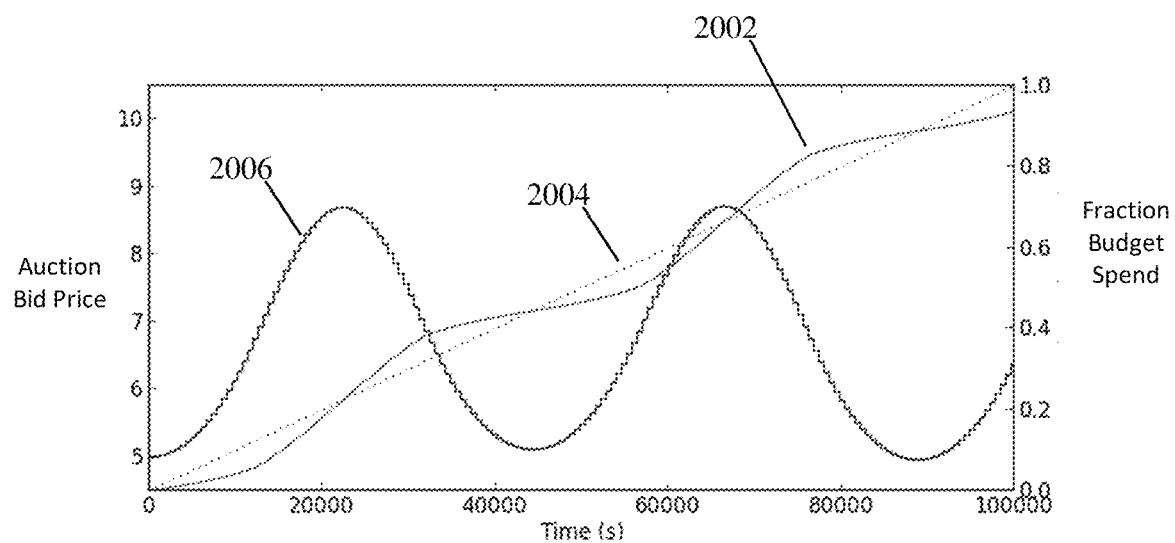
FIG. 20 shows an exemplary graph of variables related to a PID-controlled bidding process over the course of a planned timeframe.

Graph 2000 of FIG. 20 shows an example of how the variables involved in operating a PID controller may vary over the course of a campaign runtime. The solid line 2002 is the measured process variable (spend percentage) and the dotted line 2004 is the setpoint representing an ideal (linear for this example) rate of increase of the spend percentage. So in this example, the PID Controller Engine is trying to match the spend percentage 2002 as close to possible to ever-increasing setpoint 2004. Sinusoidal line 2006 is the controlled variable, or bid price. Note how bid price 2006 oscillates up and down as spend percentage 2002 falls under or over pace. It may also occur that the ideal pacing for a campaign is not that it spends evenly throughout the day. In this sense, PID Controllers are flexible because all that needs to change is the function that determines the desired set point. If a campaign wants to target users early in the day for whatever reason, a function can be created for example that calculates setpoints such that the campaign spends a majority of its budget in the early hours of the day. Note that in addition to controlling the spend rate of an advertising placement over the course of a day, the spend rate may also be controlled to follow a desired profile over the course of an entire advertising campaign, or any specified time period for that matter. Note also that while examples shown herein may depict a linear ramp of spending over the course of the specified time period, any desired profile of spending over the specified time may be achieved by controlling the setpoint appropriately.

Figure 21:
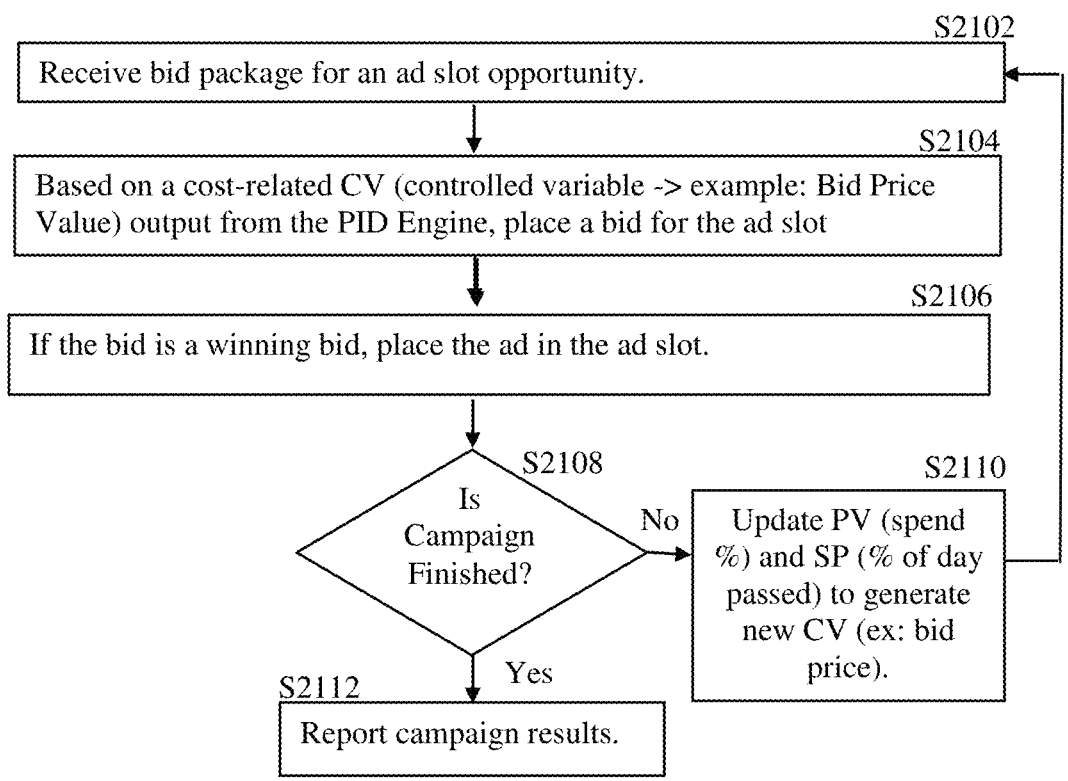
FIG. 21 shows an exemplary flow chart for a PID-controlled bidding process where the controlled variable is a cost-related parameter, such as a for example a bid price or an expected cost associated with an event.

An exemplary flowchart 2100 for describing how a PID Engine controls the pace of an advertising campaign is shown in FIG. 21. Here in step S2102 a bid package is received by a demand-side platform for an ad slot opportunity. In step S2104, based on a cost-related controlled variable output from the PID engine, a bid is placed for the ad slot. The cost-related controlled variable may comprise, for example and without limitation: a bid price; an expected cost per completion—where the ad only counts if the user actually watches at least a specified portion of it; an expected cost per click; and an expected cost per viewable view—where the ad appears on the viewable portion of a webpage and not on a portion requiring the page to be scrolled in order to see that ad. Thus, controlled process function 1902 will treat controlled variable 1914 differently depending on the chosen mode of operation. If for example a Demand Side Platform configures the system of FIG. 19 to bid based on an expected cost per completion, then the bidding engine within controlled process 1902 will adjust the bid price and the decision to bid or not bid based on a controlled variable that represents an expected cost per completion. If the PID engine 1906 determines that the budget needs to be spent faster to keep pace, it will choose to increase the expected cost per completion thereby increasing the bid prices and rate of ads placed. If the spending is ahead of the desired pace, a lower expected cost per completion will be chosen. Similarly, the system of FIG. 19 can be configured to bid based on an expected cost per click or an expected cost per viewable view. Note that "expected" parameters are determined based on historical data for costs for ad slot impressions on a specific media property where the costs were gathered over a previous time period and stored in a database on a server. When a media property having such historical data is included in an ad slot opportunity, the specific historical data for that media property is retrieved from the server for use in the decision to bid and how much to bid.

In step S2106, if the bid is a winning bid, the ad is placed for the ad slot. In step S2108, a determination is made to see if the campaign is finished. If not, per step S2110 the measured process variable (PV) and the setpoint (SP) are updated to generate a new control variable (CV) to be used in decisions regarding the next impression opportunity. If instead per step S2108 the campaign is finished, then per step S2112 the campaign completes and results are reported.

Beyond implementing a PID Controller function to control bid price, similar functionality is useful to control the pace of an advertising campaign based on other parameters. In all cases the measured process variable remains as spend percentage, but the controlled variable changes. For instance, in order to get the most views on an ad, the controlled variable is set to "expected cost per view". The expected cost per view is used in conjunction with predictions about a site's (media property's) view rate to determine whether a bid should be placed for an impression opportunity. When the campaign is underpacing the expected cost per view is increased, meaning the campaign is willing to spend more per expected view which allows the campaign to bid on more impression opportunities.

Due to the programmable nature of the PID Controller Engine, the controlled variable is easily modified and may be alternately used for other parameters such as for example completions and clicks. Table 1 below shows an exemplary and non-limiting chart of variables that are input to and output from the PID Controller Engine used in the operation of the invention to control the operation of an online advertising campaign.

TABLE 1

PID Controller Use Scenarios for Advertising Campaigns

| Example Scenario | Measured Process Variable (PV) example | Set Point (SP) example | Controlled Variable (CV) example |
|---|---|---|---|
| 1 | spend % | % of day passed | bid price |
| 2 | spend % | % of day passed | expected cost per completion |
| 3 | spend % | % of day passed | expected cost per click |
| 4 | spend % | % of day passed | expected cost per viewable view |
| 5 | spend % | % of day passed | conversion probability threshold |
| 6 | spend % | % of day passed | demographic probability threshold |
| 7 | spend % | % of day passed | intention probability threshold |
| 9 | spend % | % of day passed | behavioral probability threshold |

An exemplary and non-limiting list of possible controlled variables and their definitions are shown in Table 2.

TABLE 2

Example Controlled Variables for Advertising Campaigns

| Controlled Variable | Brief Definition |
|---|---|
| bid price | An amount bid for an impression opportunity |
| expected cost per completion | Expected cost of an impression where the viewer watches the entire video advertisement |
| expected cost per click | Expected cost of an impression where the viewer clicks as a result of viewing the impression |
| expected cost per viewable view | Expected cost of an impression where the creative is viewable on the viewer's screen |
| conversion probability threshold | A level of probability that the viewer will convert |
| demographic probability threshold | A level of probability that the viewer has one or more defined demographic characteristics |
| intention probability | A level of probability that the viewer has an intention to perform an action. (A probability |

TABLE 2-continued

Example Controlled Variables for Advertising Campaigns

| Controlled Variable | Brief Definition |
|---|---|
| threshold | that the viewer is "in the market" for some product or service). |
| behavioral probability threshold | A level of probability that the viewer has one or more behavioral characteristics. Behavioral characteristics refers to information such as how frequently a user visits a site and what their general tendencies are. It is using data on how a user behaves online. |

Note that for a parameter that is "expected", the expectation is based at least in part on historical information for the media property where the ad slot in question is located.

Pacing a Campaign Using a PID Controller and Machine Learning Models

As an alternative to optimizing on bid price or various cost-related events listed in Table 2, another exemplary controlled variable is optimizing on conversions. This is where the machine learning models come into play. The definition of a conversion is somewhat flexible, but in general it is defined as a user somehow interacting with the displayed ad and taking further action. For example, in the case of one advertiser/client's campaign, a conversion was defined as a user seeing an ad, clicking the ad, and going as far as to get a quote from the advertiser/client's website. The definition of a conversion varies on a campaign by campaign basis, but using machine learning models it is possible to predict a viewer's probability of conversion at auction time.

In order to use a viewer's probability of conversion in conjunction with the PID Engine, the PID Engine's controlled variable is set to be a conversion threshold. If the threshold is at 70%, then viewers that a machine learning model predicted as having below a 70% probability to convert on the media property associated with the ad slot opportunity will not be considered for bidding in the auction—essentially a no-bid decision for this impression opportunity. The decision to bid or not bid is made by bidding engine 1902 which implements the controlled process monitored by PID Controller Engine 1906. For one embodiment of the invention, bidding engine 1902 receives for each impression opportunity a probability that the viewer associated with the opportunity belongs to a categorization segment, and compares that probability with the probability threshold represented by CV 1914. Further as described below, bidding engine 1902 can determine a price to be bid based on the controlled variable (CV) 1914, when CV 1914 is a probability threshold.

Offline, using machine learning models a segment has been determined, which is a set of viewers that are determined to have a high probability of converting. At run time, if a viewer seeing an ad is in the segment, the control system operated by the Demand Side Platform will query the model, which returns the user's probability of converting and compares it to the conversion threshold. So when the campaign is over pacing, this conversion threshold is increased to limit the users considered to those predicted as the best by the model. When the campaign is under pacing, the conversion threshold is lowered to consider less desirable viewers in order to maintain pace. Another factor in the conversion-based example, is that the bid price is typically set to be inversely proportional to the conversion threshold. For example, if the max bid price is $15, and the conversion threshold is currently at 20%, then the bid price is set to 80% of $15, or $12. If the conversion threshold is at 80%, then the bid price is set to 20% of $15, or $3. With this inversely proportional relationship the placements will pace properly, similar to the implementation for controlling only the bid price. For other controlled variable types with probability thresholds, the bid price can alternately be directly proportional to the probability threshold or have any specified relationship to the probability threshold. In which case given the same scenario as described above, the bid price would be $3 when the conversion threshold is at 20%.

This approach can be extended to a variety of other applications as well by changing the way the segment is defined. There are four major categories of controlled variable that are described herein as non-limiting examples. The first category being conversions which are described above. The next is demographic segments. The same way as users are classified as having a high probability to convert, a user can be classified as having a high probability of belonging to a specific demographic, allowing the use of the same PID strategy. The next category is intenders, or people with an intention to buy. In this case the segment would be users with a high probability of purchasing an item. The last category is behavioral segments, where users have a high probability of exhibiting a specific behavior. All four of these types of segments represent controlled variables that lend themselves well to the same type of PID strategy.

The use of supervised machine learning using models to determine probabilities related to specific viewers has previously been introduced with respect to FIGS. 13-17 for determining the probability that a viewer has certain demographic characteristics. To produce a model for a specific controlled variable, a Supervised Learning algorithm is operated. The algorithm accesses a large set of records—in this case the information about each viewer—and a field that holds information that it is desired to predict—which is the Truth. The difference between any of the models is that the Truth differs. So, to predict demographics, the Truth is what demographic group a viewer falls into. To predict the probability that a viewer will convert, there is historical information about which viewers did and didn't convert. For Intenders, there is data from third parties about people who were in the market for particular products or services and the process can ascertain Truth based on this. At the end of the day, the viewer features and algorithms are the same, but the Truth relevant to the desired Model to build is substituted. So, there is a specific Model for each of:

Demo Model yields P(User is member of Demographic Segment)

Converter Model yields P(User will Convert)

Intender Model yields P(User will buy, User is in the market)

Behavioral Model yields P(User exhibits certain behaviors)

Many other models can be constructed using Supervised Learning and the above are only examples.

Figure 22:
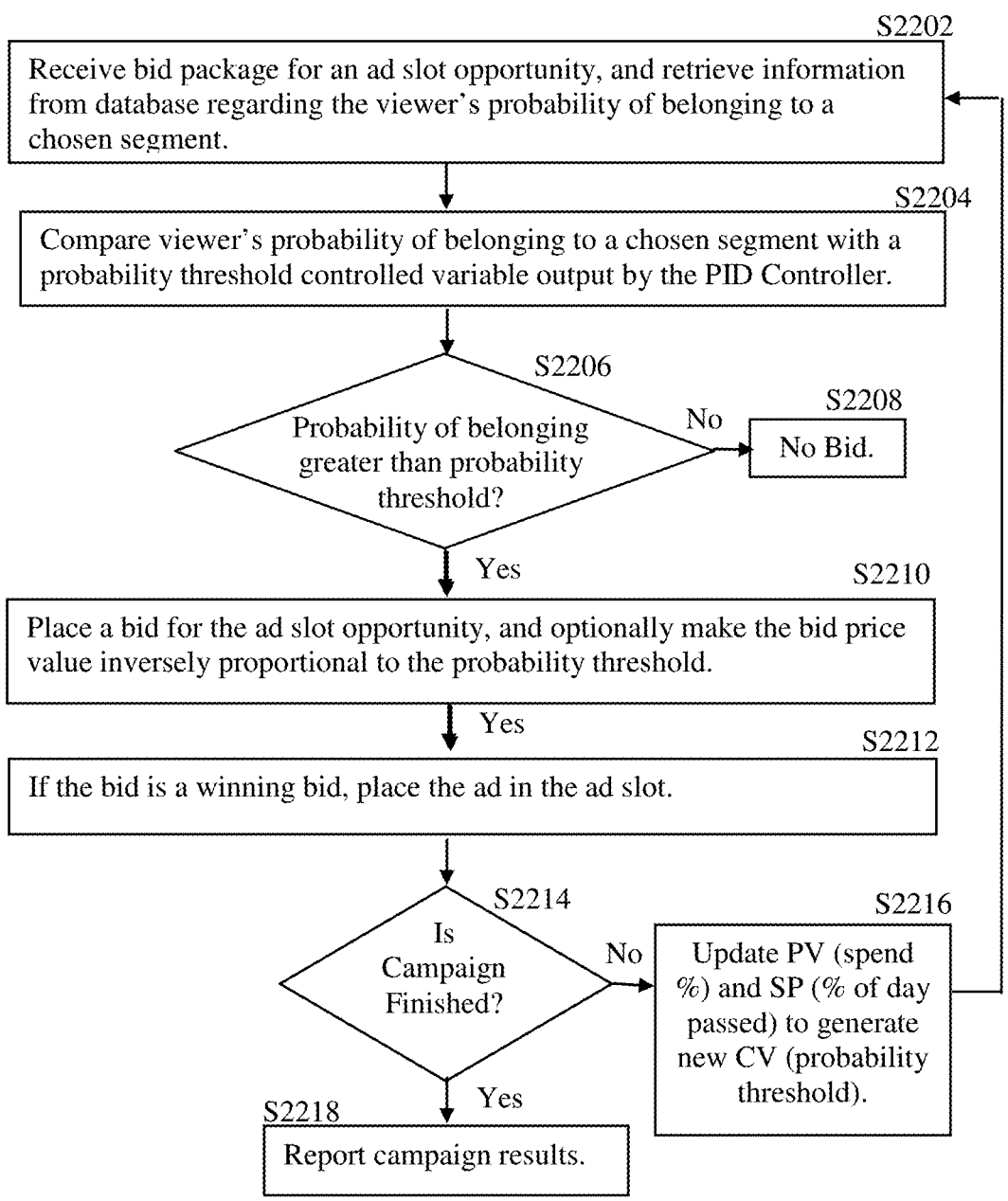
FIG. 22 shows an exemplary flow chart for a PID-controlled bidding process where the controlled variable is a probability-related parameter describing for example a probability that a characterized viewer belongs to one or more characterization segments.

An exemplary and non-limiting flowchart 2200 is shown in FIG. 22 and addresses scenarios where the controlled variable produced by a PID Engine is a threshold to be used in bidding decisions. Here in step S2202 a bid package is received by a demand-side platform for an ad slot opportunity, and information is retrieved from a database regarding the viewer's probability of belonging to a chosen segment. In step S2204, the viewer's probability of belonging to the chosen segment is compared with a probability threshold controlled variable output by the PID controller. In step S2206, a decision is made to determine if the probability that the viewer belongs to the chosen segment is greater than the probability threshold. If the probability that the viewer belongs to the segment is not greater than the threshold, then per step S2208 the opportunity is not bid. If instead the probability that the viewer belongs to the segment is greater than a probability threshold, then per step S2210 a bid is placed for the ad slot opportunity, and optionally the bid price is set to a value having a relationship to the probability threshold. One exemplary relationship is to have the bid price inversely proportional the probability threshold, while another exemplary relationship is where the bid price is directly proportional to the probability threshold. In step S2212, if the bid is a winning bid then the ad is placed in the ad slot. In step S2214 a determination is made to see if the campaign is finished. If it is not, then per step S2216 the measured process variable (PV) and the setpoint (SP) are updated to generate a new control variable (CV) to be used in decisions regarding the next impression opportunity. If instead per step S2214 the campaign is finished, then per step S2218 the campaign completes and results are reported.

The processes performed as described herein are implemented as engines (sequential machines) running on one or more processors. In particular, note that the processes claimed herein include emulating a PID Controller function which heretofore has been typically used for controlling electrochemical processing systems for—hardly an abstract idea.

Also, the quantity and complexity of the data and tasks involved in operating the invention make implementation of the invention impossible without the aid of one or more sequential machines—typically sequential processes operating on the one or more processors referred to above—and also use of a hardware communications infrastructure—typically the Internet. During the analysis and actionable processes involved, millions of data elements must be considered and without using a machine as part of the invention, implementation of the claimed processes would not be possible. For most supply-side partners, a Demand Side Platform (DSP) MUST both analyze and respond with a bid to an ad slot opportunity in less than 200 milliseconds, or the bid will be ignored. Performing the claimed processes with "pencil and paper" is impossible for many reasons, as is performing the process without the Internet. In fact, this process could not be performed within the specified time constraint regardless of the number of humans involved, were it not a computerized process. The entire process with respect to online advertisements requires an intimate usage of the Internet for the Demand Side Platform to communicate with: supply-side platforms; advertising exchanges; advertising networks; and attribution partners. The DSP must receive bid request packages, place bids, and supply the ads themselves in milliseconds via the Internet. Then, after a campaign has run, the DSP automatically receives attribution data from attribution partners. The preceding description names only some of the automated processes and actions involved in implementing the invention as claimed.

The claims reflect a computerized process since, at this time, computing resources have evolved to include "Cloud-based" computing as described above in the Background section. As such, it is also impossible to predict where (physically) the claimed processes will be executed and/or if they will be distributed across multiple machines. It is also impossible to predict the specific ownership of machines whereupon the claimed processes will be executed, and therefore against whom the claims would protect against should the claims instead have been written as system claims as opposed to the method claims attached hereto.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

At least certain principles of the invention can be implemented as hardware, firmware, software or any combination thereof. Moreover, the software is preferably implemented as an application program tangibly embodied on a program storage unit, a non-transitory machine readable medium, or a non-transitory machine-readable storage medium that can be in a form of a digital circuit, an analog circuit, a magnetic medium, or combination thereof. The application program may be uploaded to, and executed by one or more machines comprising any suitable architecture. The various processes and functions described herein may be either part of microinstruction code or part of one or more application programs, or any combination thereof, which may be executed by one or more CPUs, whether or not such machine(s) or processor(s) are explicitly shown. In addition, various other peripheral units may be connected to machine platforms such as one or more data storage units and printing units.

What is claimed is:

1. A method comprising:
    receiving targeting parameters and a budget for an online campaign;
    receiving, through a network communication system, an online ad slot opportunity from an online auction website operating on a remote server;
    determining an error value by comparing a measured variable and a setpoint value, wherein the measured variable represents a percentage spent of the budget for the campaign, and wherein the setpoint value represents a percentage of time passed for a day or for the campaign;
    utilizing the error value to determine, by a PID controller engine in response to the measured variable relative to the setpoint value, a probability threshold reflecting a threshold probability of belonging to a user segment;
    identifying a probability of a viewer belonging to the user segment;
    determining, based on the probability of the viewer belonging to the user segment relative to the probability threshold, a bid price for the ad slot opportunity;
    generating a bidding response to the ad slot opportunity comprising the bid price for the ad slot opportunity;
    providing the bidding response across a computer network within 200 milliseconds of receiving the ad slot opportunity;
    determining an updated error value by comparing an updated measured variable and an updated setpoint value, wherein the updated measured variable represents an updated percentage spent of the budget for the campaign, and wherein the updated setpoint value represents an updated percentage of time passed for the day or for the campaign;
    utilizing the updated error value to determine, by the PID controller engine in response to the updated measured variable relative to the updated setpoint value, an updated probability threshold reflecting an updated threshold probability of belonging to the user segment;
    identifying an additional probability of one or more viewers belonging to the user segment; and
    determining, based on the additional probability the one or more viewers belonging to the user segment relative to the updated probability threshold, an additional bid price for an additional ad slot opportunity.

2. The method of claim 1, wherein determining the bid price comprises determining the bid price inversely proportional to the probability threshold.

3. The method of claim 1, wherein determining the bid price comprises determining the bid price directly proportional to the probability threshold.

4. The method of claim 1, further comprising utilizing a second error value to determine, by the PID controller engine in response to the measured variable relative to the setpoint value, a second probability threshold reflecting a second threshold probability of belonging to a second user segment, wherein the second probability threshold is different than the probability threshold.

5. The method of claim 1, wherein determining the bid price further comprises:
- identifying a probability of a viewer belonging to the user segment by utilizing a demographic machine learning model to determine a percentage probability of the viewer belonging to the user segment;
- comparing the probability threshold to the probability of a viewer belonging to the user segment; and
- generating a bidding response based on the probability of a viewer belonging to the user segment being greater than the probability threshold.

6. The method of claim 4, further comprising:
- identifying a second probability of the viewer belonging to the second user segment; and
- determining the bid price further based on the probability of the viewer belonging to the user segment relative to the second probability threshold.

7. The method of claim 1, wherein the probability threshold reflecting the threshold probability of belonging to the user segment is a controlled variable determined by the PID controller engine.

8. A system comprising:
- at least one processor; and
- at least one non-transitory computer-readable storage medium storing instructions thereon that, when executed by the at least one processor, cause the system to:
  - receive targeting parameters and a budget for an online campaign;
  - receive, through a network communication system, an online ad slot opportunity from an online auction website operating on a remote server;
  - determine an error value by comparing a measured variable and a setpoint value, wherein the measured variable represents a percentage spent of the budget for the campaign, and wherein the setpoint value represents a percentage of time passed for a day or for the campaign;
  - utilize the error value to determine, by a PID controller engine in response to the measured variable relative to the setpoint value, a probability threshold reflecting a threshold probability of belonging to a user segment;
  - identify a probability of a viewer belonging to the user segment;
  - determine, based on the probability of the viewer belonging to the user segment relative to the probability threshold, a bid price for the ad slot opportunity;
  - generate a bidding response to the ad slot opportunity comprising the bid price for the ad slot opportunity;
  - provide the bidding response across a computer network in response to receiving the ad slot opportunity;
  - determine an updated error value by comparing an updated measured variable and an updated setpoint value, wherein the updated measured variable represents an updated percentage spent of the budget for the campaign, and wherein the updated setpoint value represents an updated percentage of time passed for the day or for the campaign;
  - utilize the updated error value to determine, by the PID controller engine in response to the updated measured variable relative to the updated setpoint value, an updated probability threshold reflecting an updated threshold probability of belonging to the user segment;
  - identify an additional probability of one or more viewers belonging to the user segment; and
  - determine, based on the additional probability of the one or more viewers belonging to the user segment relative to the updated probability threshold, an additional bid price for an additional ad slot opportunity.

9. The system of claim 8, wherein determining the bid price comprises determining the bid price inversely proportional to the probability threshold.

10. The system of claim 8, wherein determining the bid price comprises determining the bid price directly proportional to the probability threshold.

11. The system of claim 8, further comprising instructions that when executed by the at least one processor, cause the system to utilize a second error value to determine, by the PID controller engine in response to the measured variable relative to the setpoint value, a second probability threshold reflecting a threshold probability of belonging to a second user segment, wherein the second probability threshold is different than the probability threshold.

12. The system of claim 8, further comprising instructions that, when executed by the at least one processor, cause the system to determine the bid price by:
- identifying the probability of the viewer belonging to the user segment by utilizing a demographic machine learning model to determine a percentage probability of the viewer belonging to the user segment;
- comparing the probability threshold to the probability of the viewer belonging to the user segment; and
- generating a bidding response based on the probability of the viewer belonging to the user segment being greater than the probability threshold.

13. The system of claim 11, further comprising instructions that, when executed by the at least one processor, cause the system to:
- identify a probability of the viewer belonging to the second user segment; and
- determine the bid price further based on the probability of the viewer belonging to the second user segment relative to the second probability threshold.

14. A non-transitory computer readable medium storing instructions thereon that, when executed by at least one processor, cause a computer system to:
- receive targeting parameters and a budget for an online campaign;
- receive, through a network communication system, an online ad slot opportunity from an online auction website operating on a remote server;
- determine an error value by comparing a measured variable and a setpoint value, wherein the measured variable represents a percentage spent of the budget for the campaign, and wherein the setpoint value represents a percentage of time passed for a day or for the campaign;

utilize the error value to determine, by a PID controller engine in response to the measured variable relative to the setpoint value, a probability threshold reflecting a threshold probability of belonging to a user segment;

identify a probability of a viewer belonging to the user segment;

determine, based on the probability of the viewer belonging to the user segment relative to the probability threshold, a bid price for the ad slot opportunity;

generate a bidding response to the ad slot opportunity comprising the bid price for the ad slot opportunity; and provide the bidding response across a computer network in response to receiving the ad slot opportunity determine an updated error value by comparing an updated measured variable and an updated setpoint value, wherein the updated measured variable represents an updated percentage spent of the budget for the campaign, and wherein the updated setpoint value represents an updated percentage of time passed for the day or for the campaign;

utilize the updated error value to determine, by the PID controller engine in response to the updated measured variable relative to the updated setpoint value, an updated probability threshold reflecting an updated threshold probability of belonging to the user segment;

identify a probability of one or more viewers belonging to the user segment; and determine, based on the probability of the one or more viewers belonging to the user segment relative to the updated probability threshold, an additional bid price for an additional ad slot opportunity.

15. The non-transitory computer readable medium of claim 14, wherein determining the bid price comprises determining the bid price inversely proportional to the probability threshold.

16. The non-transitory computer readable medium of claim 14, wherein determining the bid price comprises determining the bid price directly proportional to the probability threshold.

17. The non-transitory computer readable medium of claim 14, further comprising instructions that, when executed by the at least one processor, cause the computer system to:

utilize a second error value to determine, by the PID controller engine in response to the measured variable relative to the setpoint value, a second probability threshold reflecting a threshold probability of belonging to a second user segment, wherein the second probability threshold is different than the probability threshold;

identify a probability of the viewer belonging to the second user segment; and determine the bid price further based on the probability of the viewer belonging to the user segment relative to the second probability threshold.

18. The non-transitory computer readable medium of claim 14, further comprising instructions that, when executed by the at least one processor, cause the computer system to:

identify the probability of the viewer belonging to the user segment by utilizing a demographic machine learning model to determine a percentage probability of the viewer belonging to the user segment;

comparing the probability threshold to the probability of the viewer belonging to the user segment; and generating a bidding response based on the probability of the viewer belonging to the user segment being greater than the probability threshold.

19. The system of claim 11, wherein the probability threshold reflecting the threshold probability of belonging to the user segment is a controlled variable determined by the PID controller engine.

20. The non-transitory computer readable medium of claim 14, wherein the probability threshold reflecting the threshold probability of belonging to the user segment is a controlled variable determined by the PID controller engine.

\* \* \* \* \*